(12) United States Patent
Franco

(10) Patent No.: US 7,979,301 B1
(45) Date of Patent: Jul. 12, 2011

(54) ONLINE TAXONOMY FOR CONSTRUCTING CUSTOMER SERVICE QUERIES

(76) Inventor: Hector Franco, Sunnyvale, CA (US)

( * ) Notice: Subject to any disclaimer, the term of this patent is extended or adjusted under 35 U.S.C. 154(b) by 1029 days.

(21) Appl. No.: 11/879,138

(22) Filed: Jul. 16, 2007

Related U.S. Application Data

(63) Continuation-in-part of application No. 10/651,384, filed on Aug. 30, 2003, now abandoned.

(60) Provisional application No. 60/408,219, filed on Sep. 3, 2002.

(51) Int. Cl.
*G06Q 10/00* (2006.01)
(52) U.S. Cl. ...................................................... 705/7.31
(58) Field of Classification Search ........................ 705/9
See application file for complete search history.

(56) References Cited

U.S. PATENT DOCUMENTS

| | | | | |
|---|---|---|---|---|
| 6,044,355 | A * | 3/2000 | Crockett et al. | 705/8 |
| 6,499,024 | B1 * | 12/2002 | Stier et al. | 706/50 |
| 6,560,589 | B1 * | 5/2003 | Stier et al. | 706/50 |
| 6,591,258 | B1 * | 7/2003 | Stier et al. | 706/50 |
| 6,711,585 | B1 * | 3/2004 | Copperman et al. | 1/1 |
| 6,782,391 | B1 * | 8/2004 | Scher | 707/603 |
| 7,734,699 | B2 * | 6/2010 | Bhatnagar | 709/206 |
| 2001/0049688 | A1 * | 12/2001 | Fratkina et al. | 707/104.1 |
| 2001/0054064 | A1 * | 12/2001 | Kannan | 709/203 |
| 2004/0044542 | A1 * | 3/2004 | Beniaminy et al. | 705/1 |
| 2004/0054693 | A1 * | 3/2004 | Bhatnagar | 707/104.1 |
| 2005/0055321 | A1 * | 3/2005 | Fratkina et al. | 706/45 |

OTHER PUBLICATIONS

Katsuno, Hirofumi & Alberto O. Mendelzon, "On the Difference Between Updating a Knowledge Base and Revising It," in Belief Revision, Peter Gardenfors, ed. (1992). pp. 183-203.*
Dalai, Mukesh, "Investigations into a Theory of Knowledge Base Revision: Preliminary Report," Proceedings of the Seventh National Conference on Artificial Intelligence, pp. 475-479 (1988).*

* cited by examiner

*Primary Examiner* — Beth V Boswell
*Assistant Examiner* — Neil R Kardos

(57) ABSTRACT

A heuristically developable Internet based taxonomy of data objects presented in multimedia format on web pages replaces inefficient and awkward text boxes traditionally used to submit queries to search engines. The taxonomy is supported by a selection-oriented knowledge base (SOKB) that provides on a server a navigatable network structure configured to selectively construct queries, wherein users communicate with a server via a web browser. The construction of a query is based upon knowledge captured by the SOKB as a result of a sequence of selection steps executed by the user in connection with the navigation of the network structure, whereby at each selection step a choice of classes of data objects is presented to the user. The web pages display a "THAT'S IT" button for the user to recognize the data object the user has in mind and an emergency "HELP" button for immediate assistance from a live agent.

3 Claims, 16 Drawing Sheets

| | | | | | | |
|---|---|---|---|---|---|---|
| SEARCH EFFORT | < 10 | 10 TO 20 | 20 TO 40 | 40 TO 60 | 60 TO 80 | > 80 |
| TYPICAL NUMBER OF VERTICES VISITED | < 5 | 5 TO 10 | 10 TO 20 | 20 TO 30 | 30 TO 40 | > 40 |
| TYPICAL SEARCH TIME (MIN:SEC) | < 01:15 | 01:15 TO 02:30 | 02:30 TO 05:00 | 05:00 TO 07:30 | 07:30 TO 10:00 | > 10:00 |
| PRIORITY LEVEL | L1 | L2 | L3 | L4 | L5 | L6 |
| SERVICE QUEUE MAXIMUM ACCEPTABLE RESPONSE TIME | NA | 80 SEC | 60 SEC | 45 SEC | 30 SEC | 15 SEC |

FIG. 8

ONLINE TAXONOMY FOR CONSTRUCTING CUSTOMER SERVICE QUERIES

RELATED APPLICATIONS

This application is a continuation-in-part of U.S. application Ser. No. 10/651,384, filed on Aug. 30, 2003 now abandoned, which claims the benefit of U.S. Provisional Application No. 60/408,219, filed on Sep. 3, 2002, all of which applications are hereby incorporated by reference.

FIELD OF THE INVENTION

This invention relates generally to a system and method for generating an Internet based taxonomy that guides a user through a sequence of selection clicks that progressively lead to a data object representative of a concept formed in the user's mind. The taxonomy relieves the user from the burden and agony of having to express the concept, expands the means of expression beyond language to include any type of multimedia presentation, imposes clarity and uniformity, and lets the user express the concept with any desired level of specificity. One of the major applications for the taxonomy is customer service, whereby a customer can use the taxonomy to submit a clearly specified query or inquiry to a knowledge base and receive a prompt answer provided that the answer in available in a knowledge base.

BACKGROUND OF THE INVENTION

Generally, legacy customer service systems rely upon a toll-free number the user dials to access a customer service agent. However, these systems are plagued with problems and inefficiencies that affect both the user and the organization providing the customer service.

Significant advances in modern technology, have failed so far to provide any relief for such problems and inefficiencies. Complex agent scheduling and call routing systems, automatic answering systems with voice recognition, and even dialog engines that try to emulate communication interactions between users and agents have not succeeded. At the same time, user complaints about customer service continue to grow.

Many of these technologies are disclosed in a broad spectrum of patents and patent applications, examples of which are:

U.S. Pat. No. 5,185,782 to Srinivasan discloses a system that prompts the caller to choose between holding or receiving a return call. If the caller chooses a return call, the arrangement prompts the caller for callback time and time-period. The arrangement places an outgoing call to the stored telephone number when the callback time arrives. If the call does not get through, the arrangement periodically repeats placing of the outgoing call, until the call gets through or the callback time-period expires. When it places the outgoing call, the arrangement connects the originating end thereof to an ACD agent to handle the call.

U.S. Pat. No. 5,627,884 to Williams also discloses a system that prompts the caller to choose between holding and receiving a return call. If the caller chooses a return call, caller information is automatically taken from the caller on hold, the call disconnected and the call returned at the time when the caller would have been serviced had the caller stayed on hold.

U.S. Pat. No. 6,771,760 to Vortman et al. discloses a method for generating call backs by establishing an outgoing call to an outside party expecting a call back and having a communication switch generate an incoming call responsive to the outgoing call, whereby the incoming call is treated as originated by the outside party.

US application 2001/0054064 by Kannan discloses a method to provide live customer service over the World Wide Web, whereby customers or queries sent by potential customers are intelligently routed to appropriate customer service representatives.

US application 2004/0044542 by Benniaminy discloses a dynamically updated knowledge base accessible over a network, whereby an individual can query the knowledge base to determine if the problem and its solution are found in it. If negative, the query is broadcast over the network allowing experts who listen-in the network to file-in a reply to the query and thereafter, the problem and the solution are added to the knowledge base.

U.S. Pat. No. 6,970,829 to Leamon discloses a method for planning, scheduling, and managing workforce personnel in contact centers. This prior art is based upon Erlang B and Erlang C algorithms named after the renown Danish mathematician and telephone engineer Agner Erlang who published his first paper "Theory of probability and telephone conversations" in 1909. These algorithms are applied by Leamon to the following problem: given a limited number of agents and an anticipated range of volume of inquiries how to best schedule the limited number of agents to optimize responses to the inquiries (improve the response time, reduce the number of lost inquiries, maximize the number of inquiries satisfactorily addressed, etc.). These algorithms are first run with a tentative schedule and then re-run in subsequent iterations with different parameters until a satisfactory iteration is obtained.

US application 2005/0055321 by Fraktina discloses a dialog engine, whereby the user poses a question in response to which the dialog engine engages in a dialog with the user by trying to emulate the way people interact with each other. Fratkina further discusses a logging capability that records each of the steps within a multiple-step dialog interaction with a user, as opposed to simply separate actions (clicks and queries).

US application 2003 to Mullen discloses a work management system that matches supply of agents with demand for agents by obtaining arrival statistics for tasks and resources and evaluating a composite binomial distribution of net tasks and resources in a queue to determine an expected number of enqueued tasks or resources at some future time. The work management system automatically paces outbound calls to balance supply and demand.

One of the fundamental limitations of the prior art relates to the failure to address the difficulty that a person may experience when trying to clearly express a query or inquiry because of either inadequate verbal communication skills or the non-existence of descriptive words capable of properly representing a concept formed in the person's mind.

In summary, the prior art provides a broad range of alternatives to respond to clearly expressed queries or inquiries but fails to provide a practical method to help a person express a query or inquiry in clear and definite terms. As a result, customer service is and has always been an inefficient process that creates a multitude of economic and logistic problems for many institutions, does not promote customer satisfaction, and is becoming a major impediment to improving the relationship between institutions and their customers.

SUMMARY OF THE INVENTION

The present invention addresses the aforementioned problems by providing an Internet-based taxonomy, structured as a selection oriented knowledge base, for constructing properly formulated queries. Properly formulated queries provide the basis for significant improvements of the quality and efficiency of customer service centers, whereby nearly all user inquiries can be resolved without the intervention of a live agent. Major benefits of the invention will be improved customer retention and satisfaction combined with significant reductions in operational costs of service centers.

Preferably, a web site provides access to an Internet-based taxonomy of classes of data objects representing a knowledge base that provides on a server a navigable network structure which can be traversed by a sequence of selection mouse clicks that offers the user the opportunity to effortlessly construct a query. Each click of the user's mouse can increment the knowledge captured by the selection oriented knowledge base with respect to a concept formed in the user's mind. Eventually, the sequence of mouse clicks will produce a presentation on the user's browser of a data object that the user may recognize as reflecting the concept formed in the user's mind. The user can then be asked to confirm that indeed the presentation on the user's browser reflects the concept formed in the user's mind. Upon such confirmation the selection-oriented knowledge base can construct an appropriate query to be submitted to a knowledge base.

While the user navigates the taxonomy by executing selection mouse clicks, the selection oriented knowledge base can concurrently update the presentation of the data object presented on the user's browser, based at least on a sequence of nodes visited by the user.

Each node of the selection oriented knowledge base can offer the user various selections to pursue the selection process and two escape options to terminate the navigation.

One escape option can be configured with a "THAT'S IT" button for the user to acknowledge that the current data object presented on the user's browser reflects the concept formed in the user's mind. Based on the acknowledgement, the selection oriented knowledge base can then construct the query to submit to a knowledge base and can further direct the user to an appropriate response to the query.

The other escape option can be configured with a "HELP" button for the user to request help from a live agent. If none of the selections presented to the user to continue the selection process is applicable and if the presentation provided on the user's browser does not reflect the concept formed in the user's mind, the user is invited to request immediate help from a live agent.

The live agent can operate as a backup for the selection oriented knowledge base when the selection oriented knowledge base is unable to provide on the user's browser a presentation of a data object reflective of the concept formed in the user's mind.

The live agent can perform several important functions. First, the live agent can engage in a dialog with the user to identify the concept formed in the user's mind. Second, the live agent can continue the dialog with the user to determine the reason why the selection oriented knowledge base failed to present a data object reflective of the concept formed in the user's mind. Third, the live agent can direct the user to a web page providing a response to the user's inquiry if such response is available in a known knowledge base. Fourth, the live agent can refer the user's inquiry to a research and investigation service if a response to the user's inquiry is not available in a known knowledge base.

One aspect of the invention, relates to a seamless integration of the power of expert systems with the interpretive capabilities of users and live agents to provide an efficient method to construct a query that reflects a concept formed in a user's mind.

Another aspect of the invention, relates to a three way dialog between a user, a live agent, and the selection-oriented knowledge base, whereby each participant contributes knowledge and increased perception to the dialog.

Another aspect of the invention, relates to the use of the "THAT'S IT" button prominently displayed on the web pages of the selection-oriented knowledge base to enable a user to acknowledge that a presentation of a data object on the user's browser reflects a concept formed in the user's mind.

Another aspect of the invention, relates to the use of the "HELP" button prominently displayed on the web pages of the selection-oriented knowledge base to enable a user to gain immediate access to a live agent should the user experience difficulty in obtaining from the selection-oriented knowledge base a presentation on the user's browser of a data object reflective of the concept formed in the user's mind.

Another aspect of the invention, relates to a process for iteratively improving the selection-oriented knowledge base by recording the frequency of "HELP" requests submitted per node. The nodes that produce the most requests can be analyzed off-line to identify the potential deficiencies that triggered the requests. The analysis can include information that live agents are instructed to collect describing the reasons why the user encountered difficulties. Once identified, the deficiencies can be corrected to enhance the performance of the selection-oriented knowledge base. Typical areas of improvement can include presentation clarity, topology of the selection-oriented knowledge base, and spawning new vertices associated with new classes of data objects that may be necessary to address certain deficiencies. The creation of new classes of data objects may involve tests the user may be asked to perform to further narrow and identify the issue that triggered the "HELP" request.

Another aspect of the invention, relates to a "HELP" requests predictor process for predicting the frequency of "HELP" requests that may be received for each node of the selection-oriented knowledge base. For every access to the selection-oriented knowledge base, this process can record the path of all the nodes visited by the user, the time spent in each node, and a flag indicating if a "HELP" request is generated. Off-line statistical analysis of this data can identify the frequency of requests per node, the types of paths that result in a "HELP" request, and the distribution of time-spans from the time a user accesses the selection-oriented knowledge base to the time a "HELP" request is generated. The information obtained by this analysis can be used by the aforementioned process to allocate live service agents to priority queues to ensure that the response time to "HELP" requests is below a threshold that keeps users satisfied.

Another aspect of the invention, relates to the use of multiple priority queues whereby the number of agents assigned to each priority queue is adjusted dynamically to ensure that the response time for each queue does not exceed a critical configurable limit associated with that queue, called the maximum acceptable response time (MART). The MART for each queue is preferably set to be inversely proportional to the priority level of the queue, resulting in a very short MART for the highest priority queue, and to a long MART for the lowest priority queue.

Another aspect of the invention is a cost effective web-based method to adjust the number of live agents. This method provides at least two types of agents to help users including scheduled agents to cover a minimum expected demand within a given margin of error and demand agents to cover the actual error above the minimum expected demand. The demand agents can sign up for specific time-segments that need to be covered through a web based application. The number of demand agents for each time-segment can be determined by a service agents scheduler that takes into consideration the predicted volume of "HELP" requests. The method can include a pay premium algorithm that computes the pay premium necessary to ensure sufficient participation by demand agents. For the users that are searching the selection-oriented knowledge base, the predicted volume of "HELP" requests can be estimated by a help requests predictor.

Another aspect of the invention relates to a process for motivating users to navigate the selection-oriented knowledge base. If a user encounters difficulty while navigating the selection-oriented knowledge base, the user can be given priority voice access to a live service agent just by clicking the "HELP" button. The process can reward the users in accordance with an algorithm whereby the users that make a bigger effort to navigate the selection-oriented knowledge base get a faster access to live agents.

Further aspects of this invention will become apparent in the Detailed Description and by reference to the attached drawings. The Detailed Description contains the following Sections:
I. System Overview and Components
II. Selection-Oriented Knowledge Base
III. Navigational Archive
IV. User Activity Analyzer
V. Help Requests Predictor
VI. Service Agents Scheduler
VII. Conclusion

BRIEF DESCRIPTION OF THE DRAWINGS

FIG. 8 provides an illustrative table of a one-to-one mapping of priority levels to priority service queues.

DETAILED DESCRIPTION OF THE INVENTION

In the following description, reference is made to the accompanying drawings, which form a part hereof, and which show, by way of illustration, specific embodiments or processes in which the invention may be practiced. Where possible, the same reference numbers are used throughout the drawings to refer to the same or like components. In some instances, numerous specific details are set forth in order to provide a thorough understanding of the present invention. The present invention, however, may be practiced without the specific details or with certain alternative equivalent devices and methods to those described herein. In other instances, well-known methods and devices have not been described in detail so as not to unnecessarily obscure aspects of the present invention.

I. System Overview and Components

Figure 1:
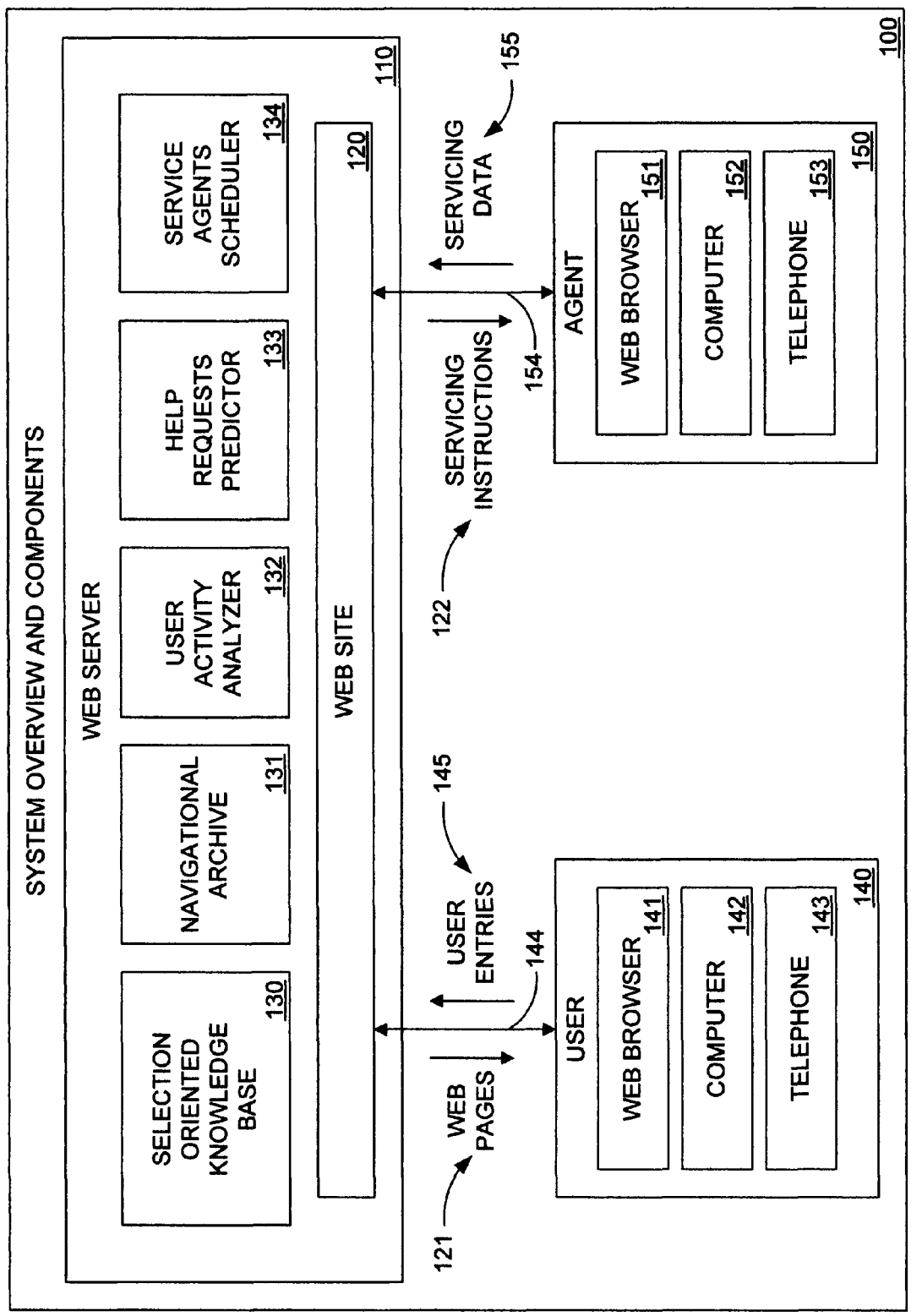
FIG. 1 illustrates a system overview and components of the invention.

FIG. 1 illustrates one embodiment 100 of the system overview and components of the present invention. A web server 110 hosts a web site 120, a selection oriented knowledge base 130, a navigational archive 131, a user activity analyzer 132, a help request predictor 133, and a service agents scheduler 134. Through the web site 120, a user 140 can access the selection-oriented knowledge base 130. An organization that provides customer service in accordance with this invention can operate its own web server 110. Alternatively the web server 110 may be operated by an independent subcontracting service on the behalf of the organization.

The user 140 can access the web site 120 through a web browser 141 running on a user computer 142 capable of accessing and displaying web pages. The user computer 142 may be, for example, a personal computer, a palmtop device configured with a web browser, or a wireless device that may access web pages using wireless applications protocol (WAP). The user computer 142 is preferably connected to the web site 120 through a computer network 144, such as the Internet. The computer network 144 can include a combination of networks, such as a wireless network combined with the Internet. Preferably, the user 140 has also access to a telephone 143 for voice communication with an agent 150. If the user 140 has access the Internet while using the telephone 143, the user computer 142 can display, concurrently with the voice connection, pertinent materials to improve and facilitate the communication with an agent 150. If the user computer is configured with a VoIP service, the user can access the web site 120 and communicate by voice with an agent using the computer 142 without the need for a separate phone connection.

The agent 150 can access the web site 120 through a web browser 151 running on an agent computer 152 capable of accessing and displaying web pages. The agent computer 152 is preferably connected to the web site 120 through a computer network 154, such as the Internet. Preferably, the agent 150 has also access to a telephone 153 that can be used for voice communication with the user 140. Alternatively, the agent can use a VoIP service through the agent computer 152 for voice communication with the user.

The web site 120 provides web pages 121 to the user 140 through the computer network 144, the user computer 142, and the web browser 141. The user 140 provides user entries 145 to the web site 120 through the web browser 141; the user computer 142, and the computer network 144. The user entries 145 preferably identify user selections and answers to questions presented to the user 140 by the web pages 121.

The web site 120 preferably creates servicing instructions 122 for each agent 150 assigned by a scheduling system to respond to a help request initiated by a user 140. These instructions can be based upon user entries 145 previously provided by the user 140 via the web pages 121. The servicing data 155 generated by an agent 150 during a voice service session with a user 140 preferably includes all the relevant information that caused the user to seek assistance from an agent 150 and a brief report on how the difficulty experienced by the user 140 was addressed and resolved.

II. Selection-Oriented Knowledge Base

Human beings tend to experience significant difficulty in expressing thoughts or observations in a uniform manner that is independent of the thinker or observer. If ten people observing exactly the same event were independently asked to describe the event, the most likely outcome would be ten diverse descriptions with little in common. On the other end, human beings possess natural interpretive capabilities that tend to be relatively uniform and extremely powerful, far exceeding the performance of the most advanced expert systems presently available.

The conventional approach offered to a user for doing a search of a knowledge base is to use search criteria provided by the user to identify portions of the knowledge base content that match such criteria. The criteria typically consist of key words, groups of keywords, or logical combinations of keywords. However, such criteria are generally inadequate to provide a specific representation of what the user has in mind. This is because the meaning and the interpretation of a word can be highly dependent on the context in which the word is used, and such context is not provided to the knowledge base by the user. Often the context extends to a significant amount of other knowledge stored in the user's mind, which may have been cumulated over long time. It would be very impractical, if not impossible, to convey such knowledge to a knowledge base or expert system. For example, an "inside joke" which can only be interpreted by a limited number of people who are privileged to the context within which such joke has meaning, could not possibly be interpreted by an expert system. This is because the context often involves knowledge that even the people privileged to the context may not be able to describe in words.

The selection-oriented knowledge base 130 interacts with the user in accordance with a three step process. The first step is to help the user locate a data object reflective of the concept formed in the user's mind. The second step is to construct a properly formulated query based on the located data object. The third step is to direct the user to a knowledge base capable of providing information responsive to the query.

The selection-oriented knowledge base 130 integrates the power of expert systems with the interpretive capabilities of human beings to provide an effective high performance knowledge base to locate a data object reflective of a concept formed in a user's mind. The selection-oriented knowledge base 130 does not place upon the user the burden of describing the query. Instead, it helps the user's thinking process by a sequence of intuitively recognizable presentations of data objects that eventually lead to the concept formed in the user's mind. To take full advantage of the human senses and interpretive capabilities, the data objects can be presented to the user by any available type of multimedia format that can be interpreted by a user. Preferably, these formats include text, graphics, sound, motion, animation, etc. After a data object reflecting a concept formed in a user's mind is clearly identified any related issues can be appropriately addressed either directly by knowledge stored in the selection-oriented knowledge base or via links to any other knowledge base that may contain the desired knowledge.

The selection-oriented knowledge base 130 relies on the following two conditions:
  (1) The mind of the user has insufficient information to satisfy the user with respect to all the properties associated with the concept formed in the user's mind; otherwise there would be no need for the user to consult a knowledge base.
  (2) The mind of the user has sufficient information in terms of some of the properties associated with the concept formed in the user's mind to be able to recognize a significant part of a selected data object presented to the user. It is from that significant part of the data object presented to the user that the selection-oriented knowledge base 130 derives information to construct a query to be submitted to a knowledge base configured to respond to the query.

The selection-oriented knowledge base 130 provides a methodology to access the interpretive capabilities of a person which enables the person to easily recognize in a data object presented to the person's senses a concept formed in the person's mind, in accordance with the saying "you know it when you see it." The selection-oriented knowledge base 130 combines this methodology with an iterative selection process to identify such concept formed in the user's mind.

The selection-oriented knowledge base 130 starts with a general data object containing the concept formed in the user's mind. Then it presents to the user a sequence of iterative selections of more specific data objects, each obtained by adding to the data object of a previous selection at least one more property to make each selection more specific and distinct. Upon each iterative selection by the user the selection-oriented knowledge base collects additional information about the concept formed in the user's mind and continues to present to the user new selections that are progressively more specific, until a data object presented to the user is recognized by the user as reflective of the concept formed in the user's mind.

The infrastructure to support the selection-oriented knowledge base 130 can be provided by a special type of activity on vertex (AOV) network. An AOV network is a directed graph in which the vertices represent tasks or activities and the edges represent precedence relations between the tasks. A more detailed description of an AOV network can be found in E. Horowitz, S. Sahni, and S. Anderson-Freed, Fundamentals of Data Structures in C. New York, N.Y.: Computer Sciences Press, 1993, p 303-309.

In one embodiment of this invention, two special types of AOV networks are used to support the selection-oriented knowledge base 130. These networks, called selection-on-vertex (SOV) and rooted-selection-on-vertex (RSOV), respectively, are defined below.

While the selection-oriented knowledge base 130, the selection-on-vertex (SOV) network, and the rooted-selection-on-vertex (RSOV) network will be described within the context of customer service inquiries it is to be understood that such context is merely illustrative of, and not restrictive on, the broad scope of this invention which can used in other types of applications for assisting people in identifying and/or expressing concepts they have in mind.

This specification is described with reference to a rooted-selection-on-vertex (RSOV) network because it offers the convenience of a single point of entry. However it is to be understood that an implementation can use the selection-on-vertex (SOV) network which provides for multiple points of entry or any other type of data structure by which the invention may be practiced.

To facilitate the description of the selection-oriented knowledge base 130 and make it clearer for the reader, the following definitions will be used:

Definition: A "property" of an object is used in the context of this specification to refer to a quality, trait, feature, attribute, characteristic, peculiarity, mark, etc., present in the object.

Definition: A "data object" is a non-empty set of properties.

Definition: Within the context of data objects, the "universe of discourse" is the set of all data objects which a person can envision.

Definition: A "class of data objects" is a subset of the universe of discourse such that all its elements have at least one property in common.

Definition: A "proper sub-class of data objects" of a class of data objects is the set of those elements of the class of data objects which have at least one property in common that is not present in the other elements of the class of data objects.

Definition: An "inquiry" is a request for information expressed as a data object.

Definition: Within the context of inquiries, the "universe of discourse" is the set of all inquiries which a person can envision.

Definition: A "class of inquiries" is a subset of the universe of discourse of inquiries such that all its elements have at least one property in common.

Definition: A "proper sub-class of a class of inquiries" is the set of those elements of the class of inquiries which have at least one property in common that is not present in the other elements of the class of inquiries.

Definition: A "selection vertex" is a vertex, associated with a class of data objects, in which the activity is the selection of one of a plurality of proper sub-classes of the class of data objects, whereby each proper sub-class is associated with a vertex that is an immediate successor of the selection vertex.

Definition: A "leaf vertex" is a vertex with no successor that is associated with a class of data objects with exactly one element and in which the activity is to terminate the selection process. In contrast, a selection vertex is associated with a class of data objects with at least two elements.

Definition: A title of a vertex (selection vertex or leaf vertex) is a brief statement descriptive of the class of data objects associated with the vertex.

Definition: A "primary selection menu" of a selection vertex is a selection menu that consists of the titles of the each of the vertices that are immediate successors of the selection vertex.

Definition: A "root vertex" is a selection vertex that has no predecessor.

Definition: A "selection-on-vertex" (SOV) network is an "activity on vertex" (AOV) network with the following properties:

(1) Has at least one root vertex.
(2) Each vertex that is not a root vertex is either a selection vertex or a leaf vertex.
(3) Each immediate successor of a selection vertex represents a unique proper sub-class of the class of data objects associated with the selection vertex and corresponds to a menu selection in the selection vertex.

Definition: A "rooted-selection-on-vertex" (RSOV) network is a selection-on-vertex (SOV) network with exactly one root vertex.

Definition: A "path" is a sequence of at least two distinct vertices, each adjacent to the next. A path with exactly two vertices is also called an edge.

Definition: A "path length" of a path is the number of vertices in the path minus one.

Definition: A "proper sub-path" of a path is a partial sequence of distinct vertices of the path, each adjacent to the next, which contains fewer vertices than the path.

Definition: A "shortcut of a path" is an edge that connects two non-adjacent vertices of the path.

Definition: A "shared shortcut of a group of paths" is a shortcut of each path in the group.

Definition: A "navigational path" is a path that starts at a root vertex and ends at another vertex, which can be a selection vertex or a leaf vertex.

Definition: An "express path of a navigational path" is the path obtained by applying at least one shortcut to that navigational path.

Definition: A "current vertex" is a vertex that is currently being visited by a user.

Definition: A "current time" at a current vertex is a calendar time, expressed as date and time-of the-day, at which a user arrives at the current vertex.

Definition: A "navigational library" of a given selection-on-vertex (SOV) network is the set of all the distinct navigational paths that can be defined for that selection-on-vertex (SOV) network.

Definition: A "path schedule" of a given path for a given user is a chronological record of the calendar times at which the given user arrives at each succeeding vertex in the path.

Definition: A "navigational archive" of a given selection-on-vertex (SOV) network for a specified period of time is the complete record of all the navigational paths followed by users over that period of time. For each navigation the record includes the navigational path identification, the user identification, the path schedule, and a record of events related to the user navigation over the path.

Definition: The "count of a path" in the navigational archive for a specified period of time is the number of times the path was traversed by users during the specified period of time.

Definition: An "evolving path" is a path that starts at a root vertex followed by each vertex visited sequentially by a user navigating a selection-on-vertex network, including the current vertex.

Definition: The "weight of an evolving path" is the count of the number of active users currently at the current vertex of that evolving path.

Definition: A "potential navigational path of an evolving path" is a navigational path of which the evolving path is a proper sub-path.

Definition: A "successor path of an evolving path" is a proper sub-path of a potential navigational path of the evolving path consisting of the current vertex and all the vertices of the potential navigational path that are not in the evolving path, whereby the successor path starts at the current vertex and ends at the last vertex of the potential navigational path.

Definition: A "successor shortcut of an evolving path" is a shortcut of a successor path of the evolving path that starts at the current vertex.

Definition: A "hit probability of a successor path of an evolving path" is equal to the number of successful navigations of that successor path of the evolving path in the navigational archive divided by the total number of successful navigations of all of the successor paths of that evolving path, in the navigational archive, wherein a navigation is successful if the vertex that terminates the successor path provides a representation of a data object reflective of a concept formed in the user's mind.

Definition: A "hit probability of a successor shortcut of an evolving path" is equal to the total number of successful navigations for all the successor paths of the evolving path that follow that successor shortcut of the evolving path in the navigational archive divided by the total number of successful navigations of all of the successor paths of that evolving path, in the navigational archive, wherein a navigation is successful if the vertex that terminates the successor path provides a representation of a data object reflective of a concept formed in the user's mind.

Definition: "RefP" denotes a configurable reference parameter to which a multiple of the hit probability of a potential navigational path of an evolving path can be compared.

Definition: "RefP0" denotes an initial value assigned to RefP.

Definition: A "likely successor path of an evolving path" is a successor path of the evolving path with a hit probability at least equal to RefP/N where "N" is a small configurable integer equal to at least 1 and at most ANSP and where ANSP (allowable number of successor paths) is a configurable integer equal to at least 1 and typically no more than 4.

Definition: "RefS" denotes a configurable reference parameter to which a multiple of the hit probability of a successor shortcut can be compared.

Definition: "RefS0" denotes an initial value assigned to RefS.

Definition: A "likely successor shortcut of an evolving path" is a successor shortcut of the evolving path with a hit probability at least equal to RefS/M where "M" is a small configurable integer equal to at least 1 and at most ANSS and where ANSS (allowable number of successor shortcuts) is a configurable integer equal to at least 1 and typically no more than 4.

Definition: A "discernable path" is an evolving pass that has at least one successor path that is a likely successor path or a likely successor shortcut.

Definition: A "navigation time of a path" (NT) for a given user, is a difference between a current time at the last vertex of the path visited by the user and a current time at the first vertex of the path visited by the user.

Definition: A "mean navigation time" (MINT) of a path is the mean of a sample of navigation times of that path.

Definition: A "help generation time" (HGT) is a time span from a moment a user arrives at a vertex to a moment when the user requests assistance from a live agent.

Definition: A "mean help generation time" (MHGT) for a given vertex is a mean of a sample of help generation times for the given vertex.

Definition: An "optimum RefP" is a value of RefP for which the mean navigation time is minimum.

Definition: "DeltaRefP" denotes a configurable value by which RefP can be decremented or incremented to seek the optimum RefP.

Definition: An "optimum RefS" is a value of RefS for which the mean navigation time is minimum.

Definition: "DeltaRefS" denotes a configurable value by which RefS can be decremented or incremented to seek the optimum RefS.

Definition: A "state" in the evolution of an implementation of a selection-oriented knowledge base, is a complete specification of the selection-oriented knowledge base that is in effect over a finite period of time called the "life cycle of the state". The specification comprises the topological configuration of the selection-on-vertex network and all the operating parameters that uniquely characterize the operation of the selection-oriented knowledge base during the life cycle of that specific state.

Definition: A vertex is designated as "tagged" if it is a potential candidate for upgrade.

Definition: NT denotes a configurable natural number representing a maximum number of vertices that can be designated as tagged during the life cycle of a particular state.

Definition: A "search effort" is a number that quantifies, in accordance with a given criterion, an amount of effort made by a user to reach a current vertex, while navigating the selection-oriented knowledge base.

Definition: A variable RT denotes a future time relative to a current time at a current vertex, wherein the variable RT has a range denoted by "rangeRT".

Definition: A "time unit" (TU) is a configurable time unit selected to express the value of the variable RT. Examples of time units are 10 seconds, 20 seconds, 1 minute, etc.

Definition: A selection-oriented knowledge base is a knowledge base preferably configured as a Selection-On-Vertex (SOV) network, which provides a taxonomical representation of data objects presentable to a user, whereby the user may be able to find by a selection process a data object reflective of a concept formed in the user's mind.

Figure 2:
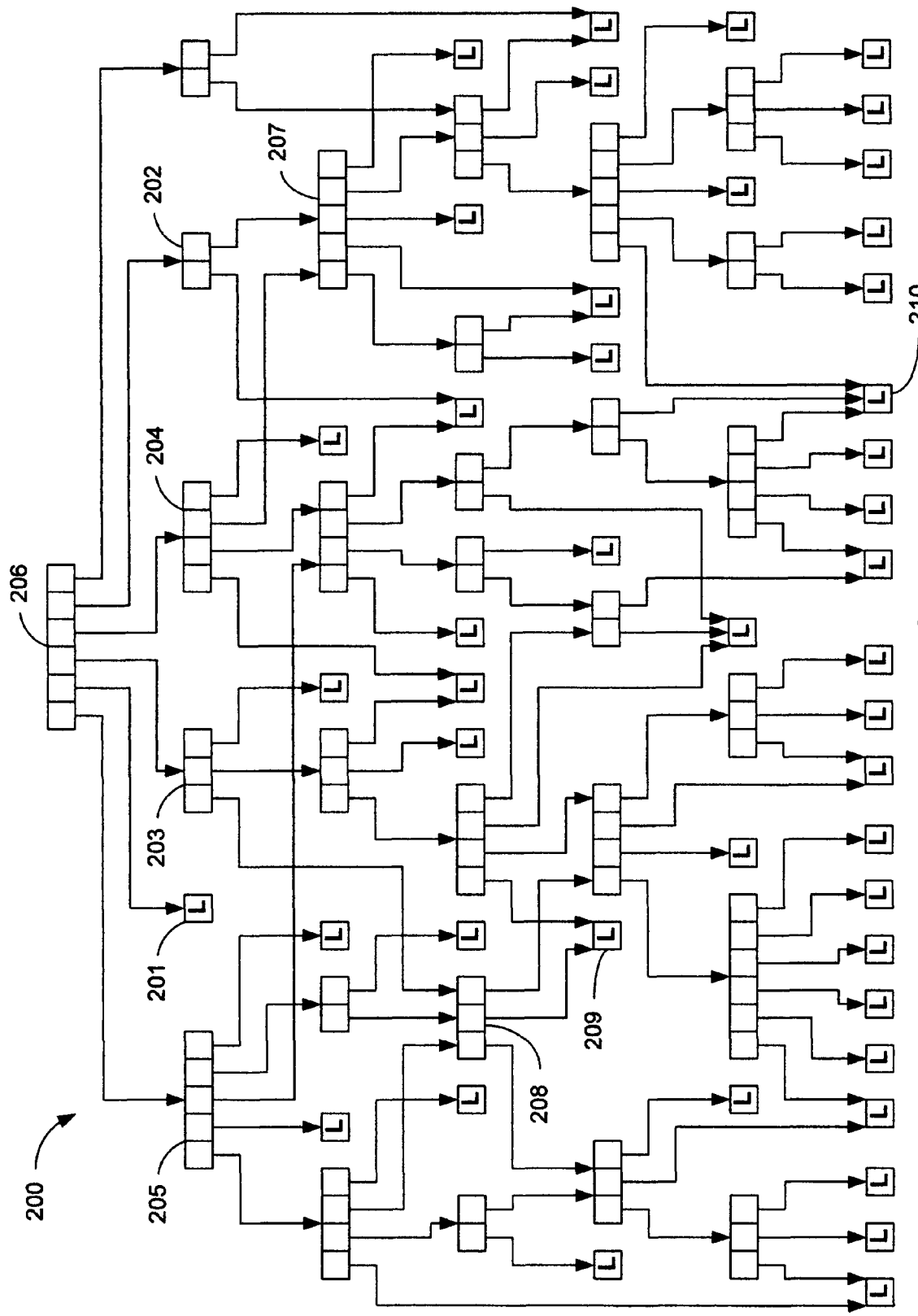
FIG. 2 shows a pictorial diagram of a selection-oriented knowledge base.

FIG. 2 provides an illustration of a rooted-selection-on-vertex network 200. It shows a plurality of leaf vertices, such as leaf vertex 201, which are all labeled with the letter "L", and have no successors. It shows a plurality of selection vertices, such as selection vertices 202 through 206, with 2 through 6 successors, respectively. The root vertex 206 is a selection vertex which has no predecessor.

In accordance with the definition of the rooted-selection-on-vertex network, any vertex, other than the root vertex or one of its immediate successors, may have more than one immediate predecessor. Examples of vertices with multiple immediate predecessors are selection vertex 207, selection vertex 208, leaf vertex 209 and leaf vertex 210. This topology provides alternative paths that lead to the same vertex, a feature that significantly increases the flexibility of the selection-oriented knowledge base 130. If a user makes a poor selection at any vertex the desired destination can still be reached, in most cases, through an alternate path. Although the alternate path may be longer than the optimal path, it is likely to be much shorter than a path that involves retracing some steps back to the point where the poor selection was made. From the user's perspective, an alternate path tends to be more appealing than the waste of time associated with retracing steps.

Figure 3:
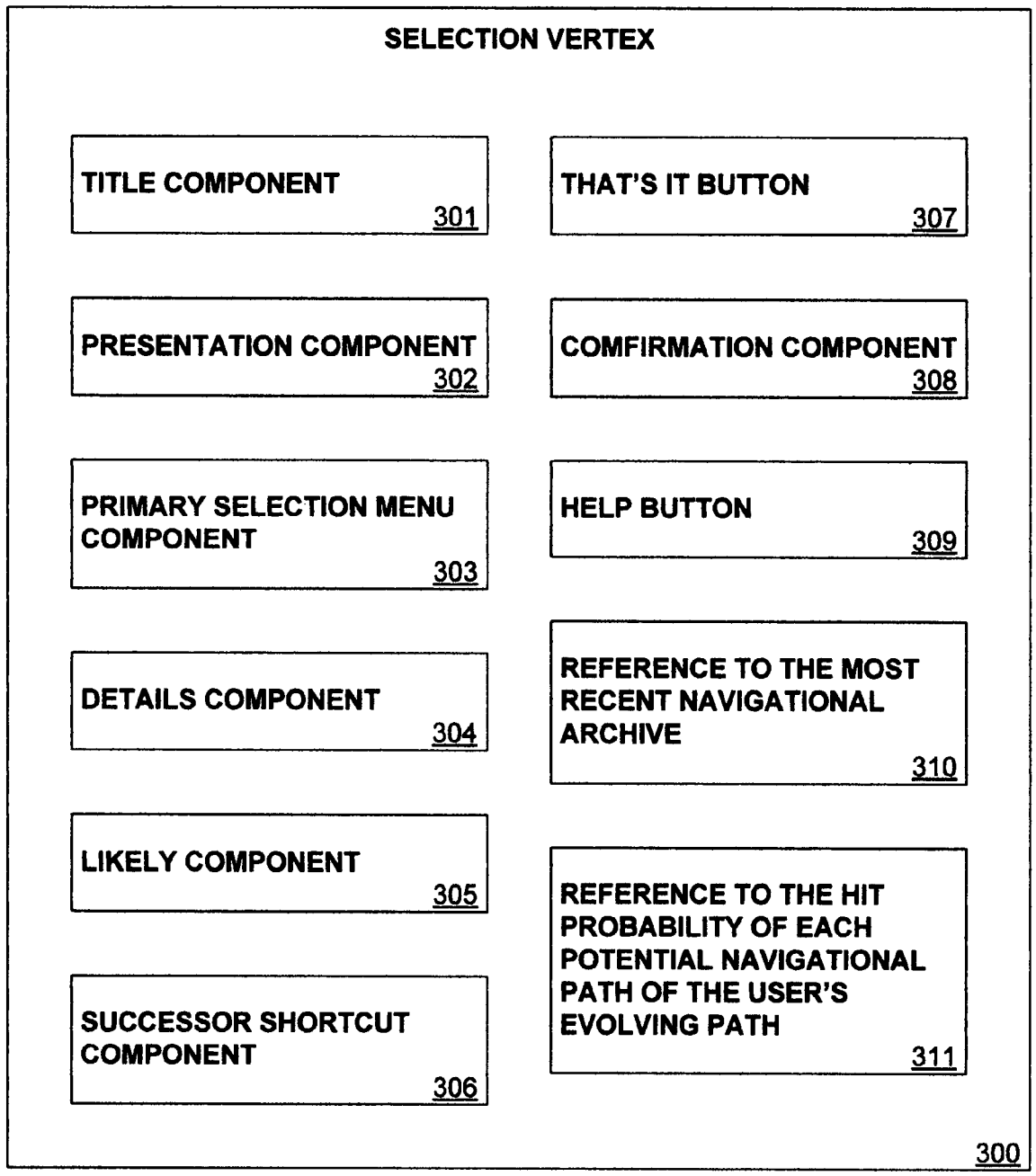
FIG. 3 illustrates a block diagram of the configuration of a selection vertex.

FIG. 3 illustrates a block diagram of one embodiment of a selection vertex 300, which preferably includes the following:

(a) A title component 301, which can show a descriptive title of the selection vertex, wherein the descriptive title can be displayed on the web pages associated with the selection vertex to provide a user a basic description of the data object associated with the selection vertex.

(b) A presentation component 302, which can provide a presentation of the properties that characterize a class of data objects associated with the selection vertex, wherein the presentation can be made via the web pages associated with the selection vertex and use multimedia formats to best convey to the user the properties that characterize that class of data objects. These properties are used to appropriately narrow the scope of each class of data objects. After a number of selection steps, the user may reach a vertex that provides a presentation of a class of data objects that the user recognizes as reflective of a concept formed in the user's mind.

(c) A primary selection menu component 303, which can provide on the selection vertex a reference to the title component of each immediate successor of the selection vertex. This set of references can be used as an adjacency list to generate the primary selection menu based on the titles of the immediate successors of the selection vertex. The primary menu can be displayed on the web page associated with the selection vertex and provides the basic mechanism for the user movements from one vertex to the next.

(d) A details component 304, which can provide on the selection vertex a reference to a details file to help the user find the best applicable menu selection. By clicking on a "details" link the user can be shown additional details about each of the menu selections. The details component can also provide suggestions in the form of "if then" statements where the "if" is associated with a guess of a concept formed in the user's mind and the "then" is associated with a suggested menu selection.

(e) A likely component 305, which can direct the user to a likely vertex associated with a data object that is likely to reflect a concept formed in the user's mind, based upon the evolving pass of the user. Preferably, the likely component is an optional component displayed only when analysis of the evolving path of the user indicates the existence of a likely successor path. The likely component can provide a link to the presentation component of the likely vertex to give the user the opportunity to determine whether or not the likely vertex represents the concept formed in the user's mind. The likely component can be used to improve the navigation speed by giving the user the opportunity to jump directly to a final destination. More than one likely component may qualify to be included in the web page associated with the current vertex.

(f) A successor shortcut component 306, which can direct the user to a non-immediate successor vertex of the current vertex that may be in a path that may lead the user to a data object reflective of a concept formed in the user's mind. Preferably, the shortcut component is an optional component displayed only when analysis of the evolving path indicates the existence of a likely successor shortcut of the evolving path. The shortcut component can also provide a link to the presentation component of the non-immediate successor vertex to give the user the opportunity to determine whether or not the non-immediate successor vertex is in the path that may lead the user to a data object reflective of a concept formed in the user's mind. The shortcut component can improve navigation speed by giving the user the opportunity to skip several steps in the navigation process. One or more shortcut components may qualify to be included on the web page associated with the current vertex.

(g) A "THAT'S IT" button 307 the user can click to acknowledge that the data object associated with the current vertex reflects the concept formed in the user's mind.

(h) A confirmation component 308 that can include both a reference to a statement that summarizes the data object whenever the user clicks the "THAT'S IT" button and a "CONFIRM" button for the user to provide the confirmation. The confirmation is used to clarify any potential misunderstanding that may have occurred between the user and the selection-oriented knowledge base 130.

(i) A "HELP" button 309 for the user to request assistance from a live agent.

(j) A reference to the most recent navigational archive 310. Preferably, this reference is used internally by selection-oriented knowledge base to facilitate the operation of a user activity analyzer described later in Section IV and is not displayed on the web pages provided for the benefit of the user.

(k) A reference to the hit probability of each potential navigational path of the user's evolving path 311. Preferably, this reference is used internally by selection-oriented knowledge base to provide access to the statistical data necessary to anticipate the data object reflective of a concept formed in the user's mind and is not displayed on the web pages provided for the benefit of the user. For each potential navigational path of the user's evolving path the hit probability is preferably stored in a table that can be periodically updated to maintain the selection-oriented knowledge base current.

Figure 4:
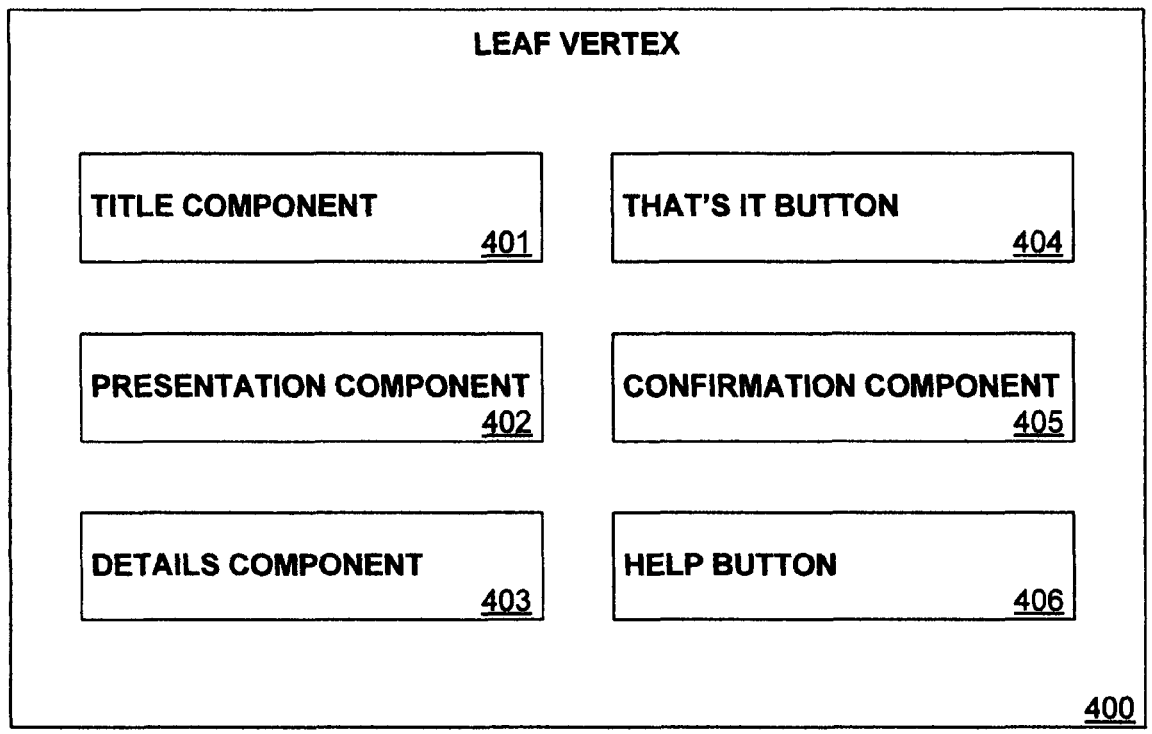
FIG. 4 illustrates a block diagram of the configuration of a leaf vertex.

FIG. 4 illustrates a block diagram of one embodiment of a leaf vertex 400, which preferably includes the following:

(a) A title component 401, which can show a descriptive title of the leaf vertex, wherein the descriptive title can be displayed on the web pages associated with the leaf vertex to provide a user a basic description of the data object associated with the leaf vertex.

(b) A presentation component 402, which can provide a presentation of the properties that characterize the data object associated with the leaf vertex, wherein the presentation can be made via the web pages associated with the leaf vertex and use multimedia formats to best convey to the user the properties that characterize that data object. These properties are used to appropriately define the data object associated with the leaf vertex.

(c) A details component 403, which can provide on the leaf vertex a reference to a details file to provide the user further details of the data object represented by the subject leaf vertex. A "details" link can be provided for the user to access the details file.

(d) A "THAT'S IT" button 404 the user can click to acknowledge that the data object associated with the leaf vertex reflects the concept formed in the user's mind.

(e) A confirmation component 405 that can include both a reference to a statement that summarizes the data object whenever the user clicks the "THAT'S IT" button and a "CONFIRM" button for the user to provide the confirmation. The confirmation is used to clarify any potential misunderstanding that may have occurred between the user and the selection-oriented knowledge base 130.

(f) A "HELP" button 406 for the user to request assistance from a live agent.

According to one embodiment, in a typical navigation of the selection-oriented knowledge base a user proceeds through a path starting at the root vertex 206. For each successive vertex visited by the user, the scope of the class of data objects associated with each successive vertex visited is more specific than that of the previous vertex visited.

Eventually the user may reach a vertex where the user recognizes the presented data object as reflective of a concept formed in the user's mind. When this occurs, the user can acknowledge such recognition by clicking the "THAT'S IT" button preferably prominently displayed on the web page associated with each vertex. The user can then be asked to confirm the acknowledgement by clicking a "CONFIRM" button. Upon receipt of the confirmation, the selection-oriented knowledge base can construct a query based at least on the data object presented. The query can then be submitted to a knowledge base configured to provide the user the information the user is seeking.

If the vertex where the user clicks the "THAT'S IT" button is a selection vertex, it indicates that the class of data objects has at least two elements as opposed to a specific data object. Alternatively, if the vertex where the user clicks the "THAT'S IT" button is a leaf vertex, it indicates that the class has exactly one specific data object as opposed to a class with at least two data objects.

To illustrate the distinction between a selection vertex and a leaf vertex in this application, consider a simple exemplary case of a data object that can be easily described by words, such as the data object associated with the word "circle". If the data object is the abstract geometric shape "circle" irrespective of the radius of the circle, the plane where the circle lies, and the position of the center of the circle on the plane, than the data object is the abstract class of all circles associated with a selection vertex. On the other hand, if the data object is a 4 inch diameter circle drawn on an 8.5 by 11 inch white sheet of paper lying on top of a user's desk, then the data object represents one specific circle associated with a leaf vertex. At this leaf vertex all the properties that uniquely identify the specific circle have been established enabling a user to fully visualize the circle as a specific data object.

A type of data object of special interest is an inquiry/question when a user is seeking an answer to an inquiry/question. In this case the user utilizes the selection-oriented knowledge base to construct a query that reflects the inquiry/question. The query can then be submitted to a knowledge base configured to provide a response to the user's inquiry/question. Techniques for submitting clearly formulated queries to knowledge bases are well understood by those versed in the art and will not be further discussed.

Preferably, the confirmation component 308 of a selection vertex and the confirmation component 405 of a leaf vertex are both used to display a confirmation statement that summarizes the data object associated with the vertex. After the user clicks the "THAT'S IT" button, acknowledging that the presentation provided on the user's browser reflects the concept formed in the user's mind, the selection-oriented knowledge base can display the confirmation statement to clarify any potential misunderstanding that may have occurred between the user and the selection-oriented knowledge base. This feature can be configured to with an option for the user to cancel the submission of the query should the user believe that a misunderstanding occurred. In this case, the option can further guide the user back to the selection process or to a live agent to assist the user.

Figure 5A:
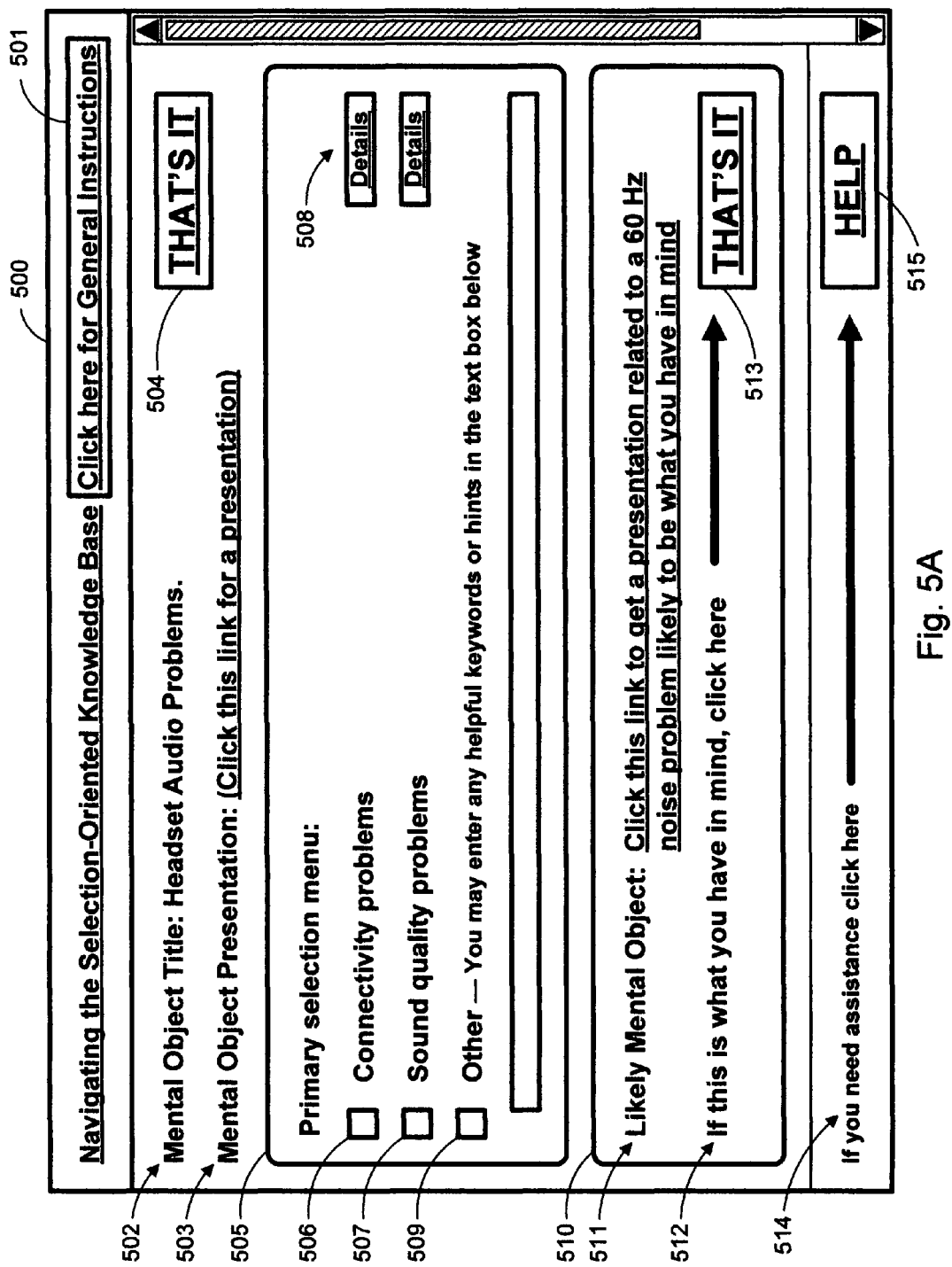
FIGS. 5A-C illustrate exemplary web pages associated with a vertex of the selection-oriented knowledge base.
Figure 5B:
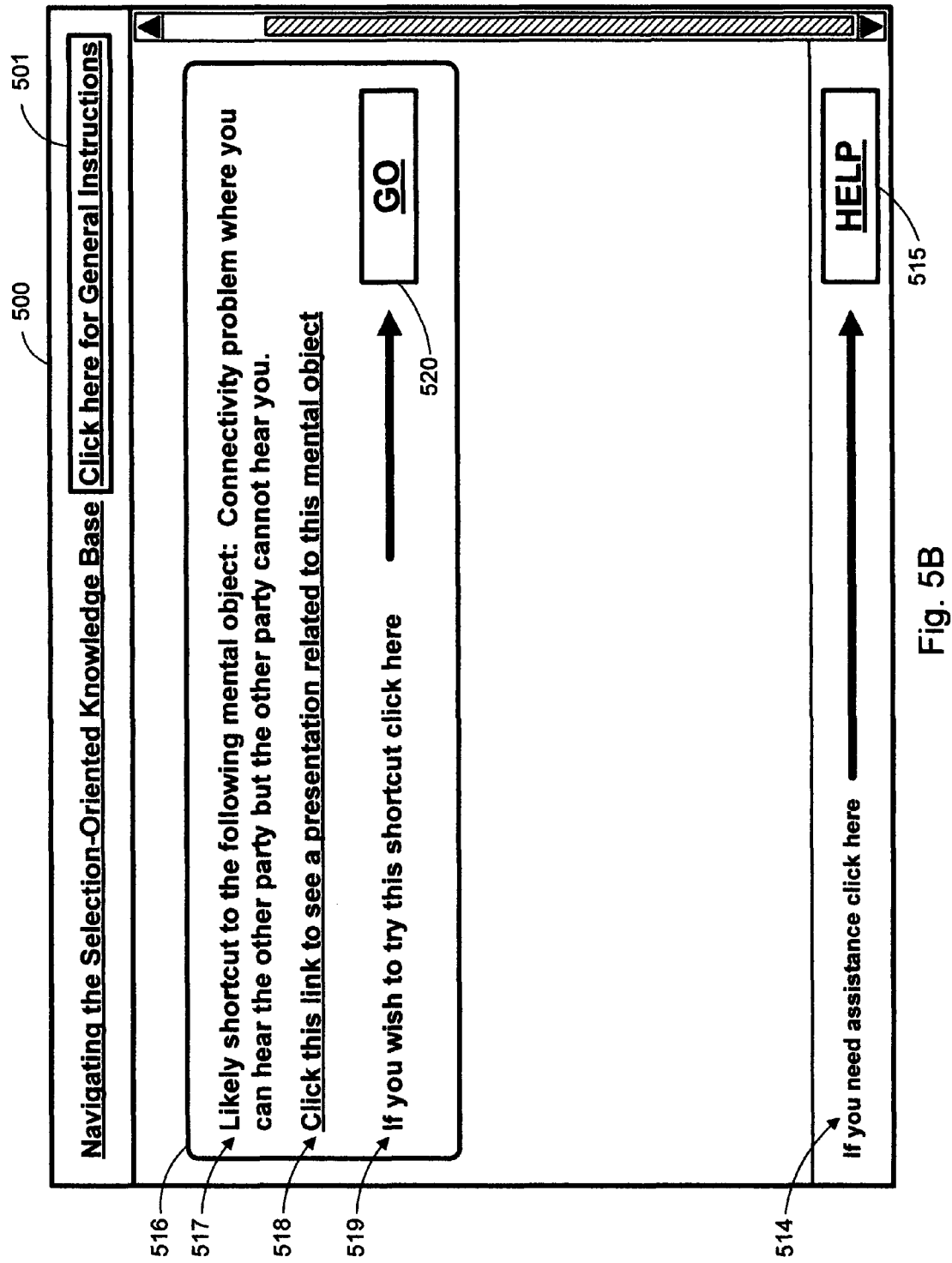
Figure 5C:
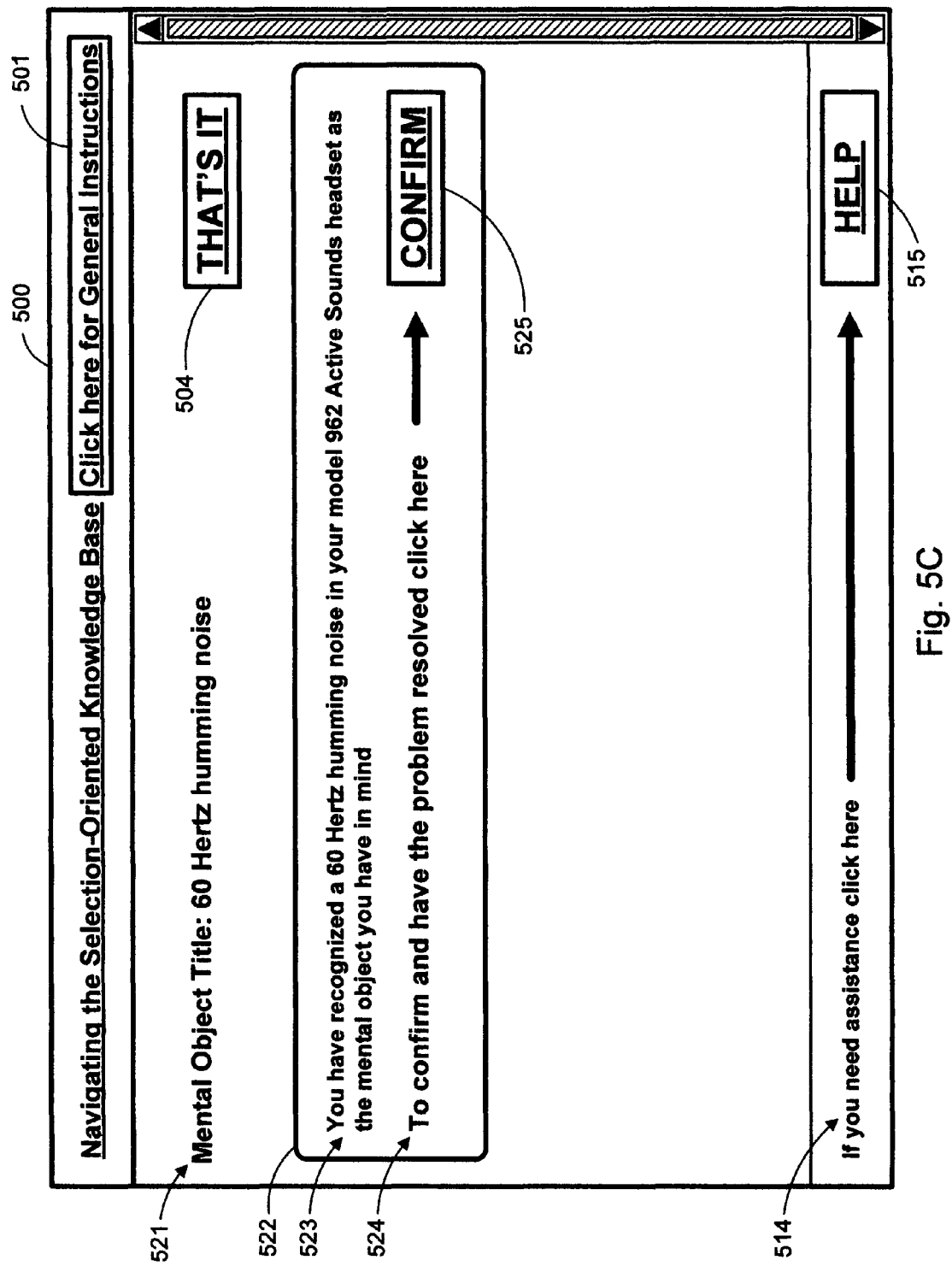

FIGS. 5A-C show three exemplary web pages that illustrate the operation of the selection-oriented knowledge base 130 in a set of hypothetical circumstances, whereby a user accesses a customer service web site of a company that manufactures headsets to inquire about a headset malfunction. After visiting several vertices, the user eventually arrives at a current vertex related to headset audio problems.

FIG. 5A illustrates the upper part of an exemplary web page 500 associated with the current vertex from one embodiment of the selection-oriented knowledge base 130. To obtain general instructions the user can, at any time, click a button 501. The page shows a data object title 502 that briefly describes the data object associated with the current vertex. A link to a presentation of the data object 503 gives the user the option to access the presentation. If the data object presented is reflective of a concept formed in the user's mind, the user can so acknowledge by clicking a "THAT'S IT" button 504.

A menu box 505 contains a set of primary menu selections among which the user may find the one that may contain the malfunction the user is observing. The primary selections shown in this illustration include a class related to connectivity problems 506 and a class related to sound quality problems 507. For each of these menu selections, there is a "Details" button 508 which, when clicked, provides the user additional details about that selection.

Preferably, the menu box associated with each vertex also contains a general purpose selection titled "Other" 509 associated with a natural language text box should the user be interested in entering any helpful keywords or hints that may suggest to the selection-oriented knowledge base 130 a data object reflective of the concept formed in the user's mind. Preferably, the user is not required to make an entry in the text box and if no entry is made the selection-oriented knowledge base can present to the user alternate choices based upon the user's evolving path. The selection other serves two basic purposes. First, it minimizes the chances that the user will get stuck and will have to request assistance from a live agent. Second, it captures very important information on user perceptions and interpretations that can be used to improve the performance of the selection-oriented knowledge base 130. These perceptions can be derived from text entries made by the user in the text box and from another selection made by the user in response to new data objects which can be presented to the user by the selection-oriented knowledge base in connection with the choice "other".

The figure assumes that a menu box selection is exercised once the user clicks on the selection. Alternative implementations may use a two click process, whereby the first click is used to place a check mark on the box adjacent to the selection and the second click is used to exercise the selection with a "GO" button, not shown. The exercise of a selection takes the user to an immediate successor vertex for another step in the navigation process.

FIG. 5A also shows a likely data object box 510 that can significantly reduce the user's navigation time. Based upon the evolving path of the user and based upon statistical analysis of similar paths followed by previous users, the user activity analyzer 132 can identify each successor path of the user's evolving path that may qualify as a likely successor path. Each likely successor path is terminated by a vertex likely to represent the data object reflective of a concept formed in the user's mind. The illustration of FIG. 5A depicts the case of one likely successor path being identified. The likely data object box 510 displays a link to a presentation of the likely data object 511 inviting the user to click the link to get the presentation. A statement 512 points the user to another "THAT'S IT" button 513 for the user to click if the data object is reflective of the concept formed in the user's mind.

If the user experiences difficulties and is not able to reach a vertex with a data object reflective of a concept formed in the user's mind, an assistance statement 514, shown at the bottom of the web page 500, invites the user to click a "HELP" button 515 to get prompt assistance from a live agent. This feature addresses two of the most important aspects of this invention.

The first aspect is the integration of machine power and human interpretation capability by the intervention of a live agent to guide a user to a data object reflective of a concept formed in the user's mind. In accordance with this aspect, the guidance is addressed by the selection-oriented knowledge base 130, for as long as the selection-oriented knowledge base 130 can guide the user closer to a data object reflective of the concept formed in the user's mind with each selection made by the user during the navigation process. If the user ceases to make progress and/or gets stuck, a qualified agent is seamlessly integrated in the navigation process to extend the capability of the selection-oriented knowledge base 130 and provide the user the needed help to arrive at a data object reflective of the concept formed in the user's mind. The extension of capability relies upon the superior interpretive capability of a live agent versus that of an expert system and lets the user decide when it is appropriate to get a live agent involved.

The second aspect is the reliance upon the live agent to identify the reasons why the user encountered difficulty. Through a dialog with the user, the agent can interpret far better than an expert system the potential reasons that may have created difficulties for the user. Collecting and storing these reasons is crucial to support the evolution of the selection-oriented knowledge base to a level of performance whereby agent assistance is seldom required. Without the participation of the live agents it would be very difficult if not impossible to collect the extremely valuable knowledge necessary to perform the successive steps of improvement of the selection-oriented knowledge base disclosed later in this section.

The seamless integration of a live agent to help locate a data object reflective of the concept formed in the user's mind is supported by the help requests predictor module 133, described in Section V, and the service agents scheduler 134, described in Section VI, whereby these modules ensure a prompt response to user "HELP" requests. Using anticipated "HELP" forecasts generated by the help requests predictor, the service agents scheduler 134 is able to schedule an agent to assist a user within seconds after a "HELP" request is generated. From the user's perspective, this feature can make the response to "HELP" requests appear seamless.

FIG. 5B illustrates the lower part of the web page 500 associated with this current vertex. It shows a shortcut box 516, which can be automatically displayed on the web page when analysis of the evolving path indicates a likely shortcut the user may wish to take. The shortcut box 516 shows a statement 517 describing a data object associated with a vertex at the end of the shortcut and a link to a presentation 518 related to that data object. If the user determines that the data object presented takes the user closer to the concept formed in the user's mind, a statement 519 directs the user to click a "GO" button 520, which takes the user directly to the vertex at the end of the shortcut.

FIG. 5C illustrates the confirmation component of the web page 500. This component is preferably displayed after the user clicks a "THAT'S IT" button. It can show the title of the data object 521 recognized by user as reflecting the concept formed in the user's mind. It can also show a confirmation box 522 with a brief statement 523 describing the data object associated with the vertex where the user clicked the "THAT'S IT" button and a confirmation statement 524 directing the user to click the "CONFIRM" button 525 to execute the confirmation.

Figure 6A:
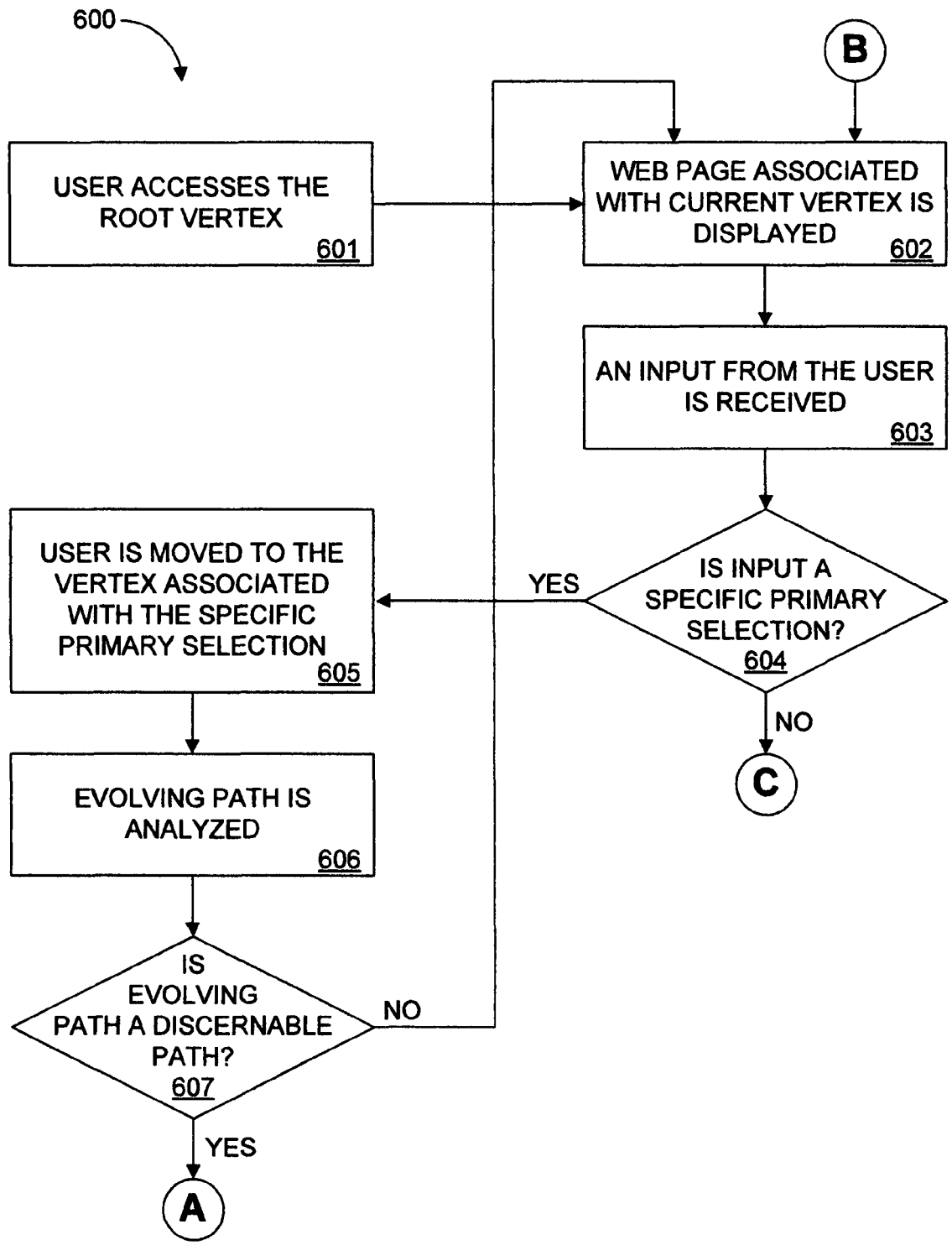
FIGS. 6A-C illustrate a typical process by which the navigation of the selection-oriented knowledge base can take place.
Figure 6B:
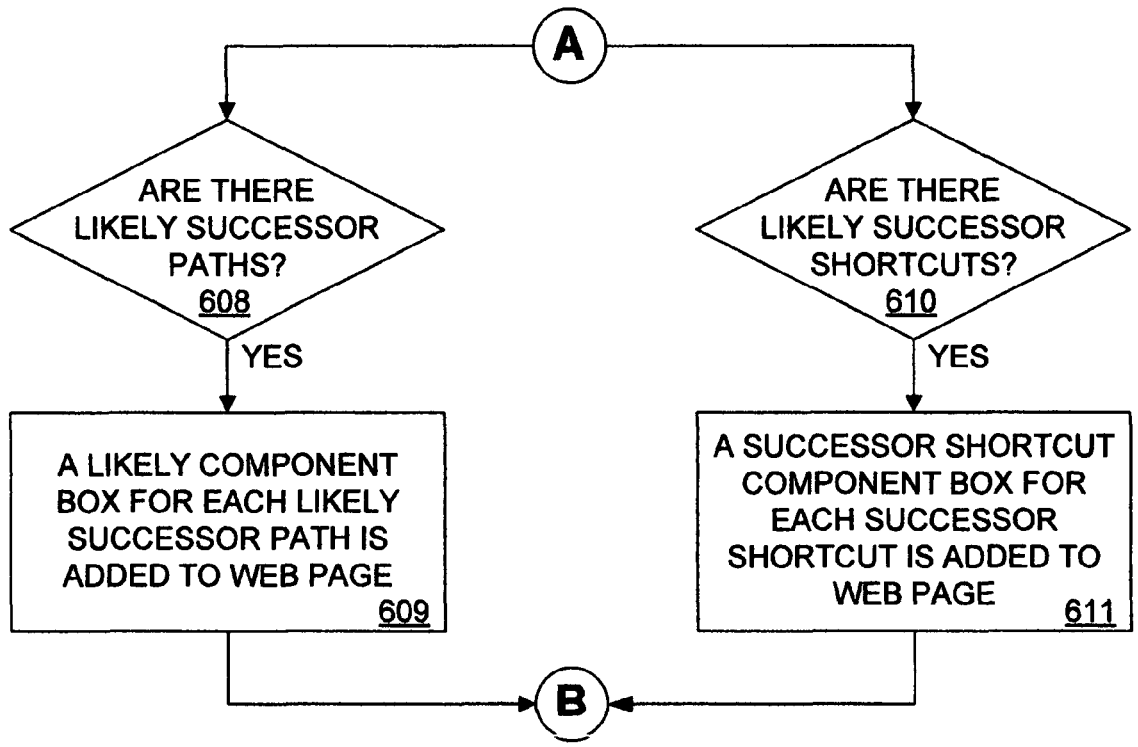
Figure 6B:
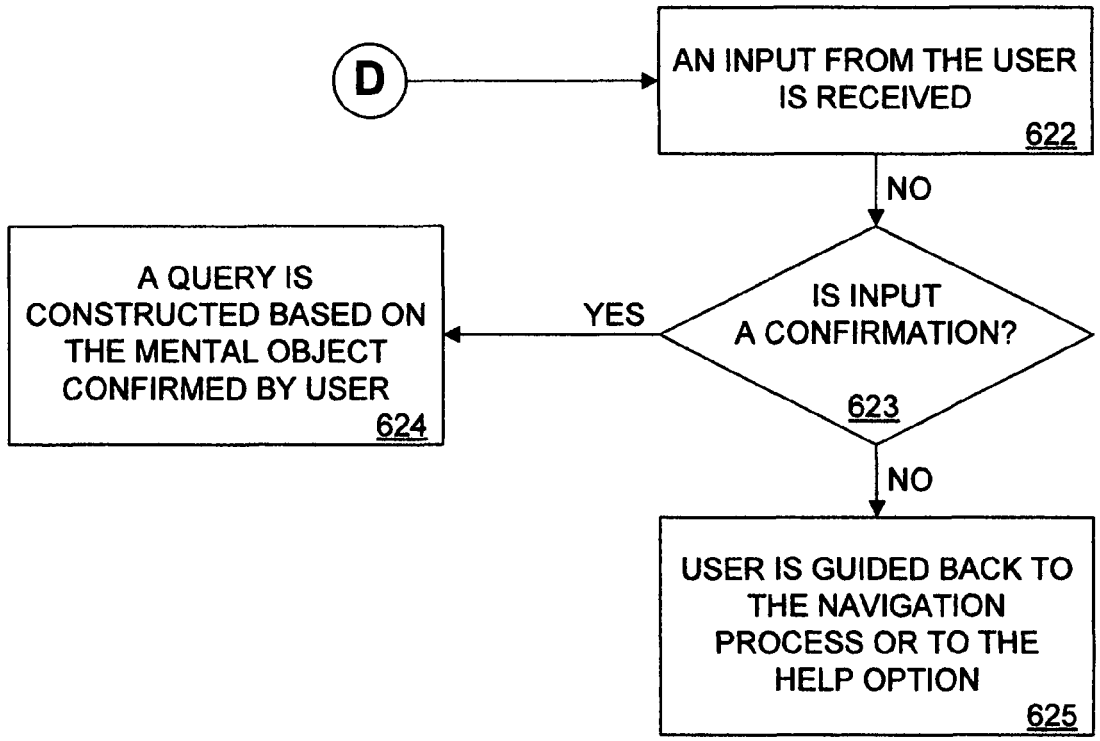
Figure 6C:
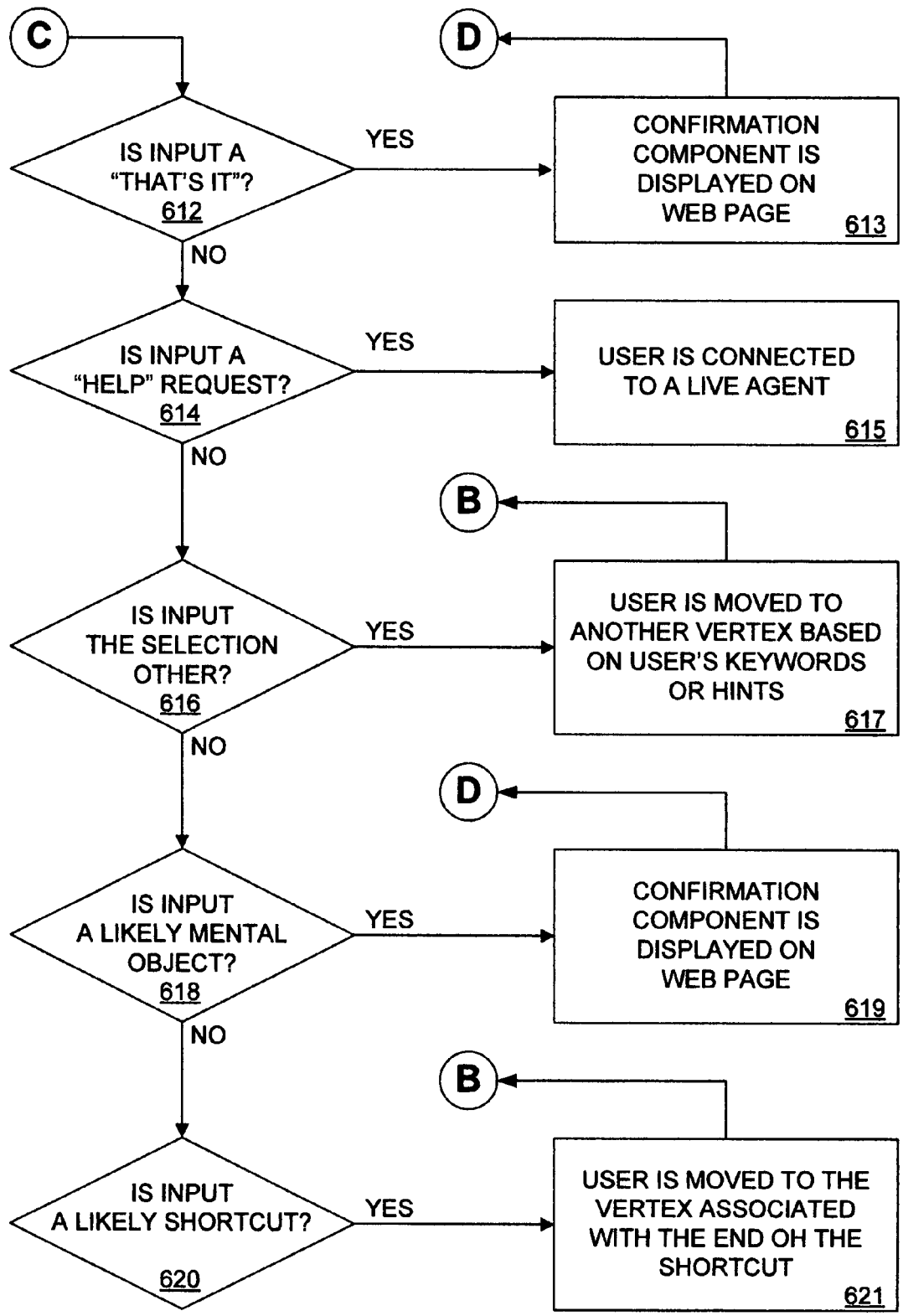

FIGS. 6A-C illustrate the major steps of a typical process 600 by which the navigation of the selection-oriented knowledge base 130 takes place in one embodiment of the invention.

At step 601, a user accesses the root vertex of the selection-oriented knowledge base.

At step 602, a web page associated with the current vertex is displayed. At the root vertex the web page can be limited to the title component 301, the primary selection menu component 303, and the details component 304, because the only action the user can take is to make a selection. However for subsequent vertices several of the remaining components may be required.

At step 603, an input from the user is received. At the root vertex a typical input will be a selection from the primary selection menu but for subsequent vertices other options become available.

At step 604, the user input is examined to determine if it is a specific selection from the primary selection menu. If the outcome is affirmative, the process continues with step 605 else the process continues with step 612.

At step 605, the location of the user in the selection-oriented knowledge base 130 is preferably moved from the vertex where the user made the selection to the vertex associated with the primary menu selection made by the user. At the end of this step the user is of record at the vertex associated with the primary menu selection.

At step 606, the evolving path of the user is analyzed to determine if an evolving path can be discerned.

At step 607, if the evolving path is a discernable path, the process continues with steps 608 and 610, else the process goes back to step 602.

At step 608, the discernable path is examined to determine if there are any likely successor paths. If the outcome is affirmative, the process continues with step 609.

At step 609, a likely component box for each likely successor path is added to the contents of the web page associated with the specific primary selection. From step 609, the process goes back to step 602.

At step 610, the discernable path is examined to determine if there are any likely successor shortcuts. If the outcome is affirmative, the process continues with step 611.

At step 611, a successor shortcut component box for each likely successor shortcut is added to the contents of the web page associated with the specific primary selection. From step 611, the process goes back to step 602.

At step 612, coming from step 604 when the outcome of step 604 is not affirmative, the user's input is tested to determine if it results from the user clicking the "THAT'S IT" button indicating that the user recognizes the data object associated with the current vertex as reflecting the concept formed in the user's mind. If the outcome is affirmative, the process continues with step 613, else the process goes on to step 614.

At step 613, the confirmation component 308 is displayed on the web page of the current vertex in response to the "THAT'S IT" input from the user. From step 613, this branch of the process continues with step 622 where an input from the user is received in response to the display of the confirmation component 308.

From step 622, the process continues with step 623 where the input from the user is examined to determine whether or not the input is a confirmation that the data object associated with the current vertex is reflective of the concept formed in the user's mind. It step 623 is affirmative the process continues with step 624, else the process continues with step 625.

At step 624, a query is constructed based on the data object confirmed by the user. This step represents a successful completion of the navigation process whereby the data object reflecting the concept formed in the user's mind has been successfully translated into a query that can be submitted to a knowledge base configured to respond to the query.

At step 625, the user is guided back to the navigation process or the help option. Step 625 reflects the event that the user had an opportunity to further examine the data object associated with the current vertex and eventually decided that the data object did not properly reflect the concept formed in the user's mind. At this juncture there various options, not shown in the illustrated process 600, which can be suggested to the user by the selection-oriented knowledge base 130. Examples of such options include:

(1) The user could be presented with selections from the menus of nearby vertices identifying other data objects that may better reflect the concept formed in the user's mind. If the user elects to pursue one of the presented selections, the user would be moved to the vertex associated with that selection and the process would be recycled back to step 602.

(2) The user could be shown the detailed characteristics of the data object associated with the current vertex and then asked be to identify among those characteristics one or more characteristics that are not reflective of the concept formed in the user's mind. Based on this information, the selection-oriented knowledge base 130 may be able to find another vertex representing another data object that is closer to reflecting the concept formed in the user's mind. If the user elects to pursue this other data object, the user would be moved to the vertex associated with that data object and the process would be recycled back to step 602.

(3) The user could be directed to the help option to get assistance from a live agent. The reasons that may have led the user to first recognize the data object associated with the current vertex as reflective of a concept formed in the user's mind and later during the confirmation step reject the earlier confirmation may be simple or complex. For simple reasons the selection-oriented knowledge base 130 may be able to guide the user to a successful completion of the navigation process. However, for complex reasons the live agent can be a far better alternative. Not only is the live agent more apt to guide the user in the proper direction, but the live agent can also dig deeper into the user's mind to collect information that may be very valuable for the improvement of the selection-oriented knowledge base 130.

At step 614, coming from step 612 the user's input is tested to determine if it results from a "HELP" request from the user. If the outcome is affirmative, the process continues with step 615, else the process goes on to step 616.

At step 615, the user is connected to a live agent who becomes integrated in a three way interaction including the user, the live agent and the selection-oriented knowledge base 130.

At step 616, the user's input is tested to determine if it results from the user clicking "Other" in the primary selection menu. If the outcome is affirmative, the process continues with step 617, else the process goes on to step 618.

At step 617, the user is moved to another vertex based upon any key words or hints the user may have provided in the text box associated with the selection "Other". If the user does not provide any key words or hints, the selection-oriented knowledge base 130 can search the navigational archive 131 for navigational paths for which the evolving path of the user can be an approximate sub path. From these navigational paths, those vertices near the current vertex can be selected and presented to the user as a special menu, not shown in the illustration of process 600. One of these menu selections may provide a good restarting point for the user to resume the navigation. If this alternative fails, the user can be invited the request assistance from a live agent, which has the advantage of providing the opportunity for collecting information that may be very valuable for the improvement of the selection-oriented knowledge base 130. At the completion of step 617, the process recycles back to step 602 to start another cycle from the vertex to which the user may have been moved.

At step 618, the user's input is tested to determine if it results from the user clicking a "THAT'S IT" button 513 associated with a likely data object 511 presented on the web page of the current vertex. If the outcome is affirmative, the process continues with step 619, else the process goes on to step 620.

At step 619, the confirmation component 308 is displayed on the web page of the current vertex in response to the "THAT'S IT" input from the user. From step 619, this branch of the process continues with step 622 where an input from the user is received in response to the display of the confirmation component 308. Step 622 is followed by steps 623-625 described above.

At step 620, the user's input is tested to determine if it results from the user clicking a "GO" button 520 associated with a likely shortcut 517 presented on the web page of the current vertex. If the outcome is affirmative, the process continues with step 621.

At step 621, the user is moved to the vertex associated with the end of the suggested shortcut. At the completion of step 621, the process recycles back to step 602 to start another cycle from the vertex to which the user may have been moved.

Another significant aspect of the selection-oriented knowledge base 130 is that its acquisition of knowledge can take place by an evolutionary process in which the user plays a very important role. The selection-oriented knowledge base 130 starts with a "setup phase" during which the root vertex, all of its immediate successors, and any number of additional vertices can be created from previously available knowledge. The setup phase gives the selection-oriented knowledge base 130 a seed configuration from which the selection-oriented knowledge base 130 can evolve and its level of knowledge can be expanded.

The setup phase is followed by a "learning phase" during which a significant amount of knowledge is added. This added knowledge comes from two sources. A first source relates to knowledge that is automatically collected during the process by which users navigate through the vertices of the selection-oriented knowledge base. A second source relates to knowledge that is collected by agents that respond to "HELP" requests from users. Additional details regarding the collection and use of such knowledge are described later in Section III, in connection with the navigational archive 131.

At the completion of the learning phase, the selection-oriented knowledge base typically reaches a stage of maturity whereby no further knowledge can be cost effectively added. This happens when the residual user navigations that require agent assistance are practically limited to those few that rarely occur. There is a crossover point where the investment to develop the additional knowledge to address these residual user navigations has no payback when equated to the cost of the few live agents necessary to address the residual user navigations. Such crossover point establishes the completion of the learning phase.

The selection-oriented knowledge base 130 can be provided with appropriate algorithms that compute and compare the costs associated with knowledge development to the costs associated with live agents and automatically establish this crossover point for the benefit of system managers responsible for the operation of the selection-oriented knowledge base.

Once the learning phase is declared complete, the selection-oriented knowledge base enters a "maintenance phase" during which no significant effort needs to be applied to knowledge development. The maintenance work is essentially limited to edits and updates to reflect any changes in the environment in which the selection-oriented knowledge base operates including changes in user behavior.

Preferably, the learning phase consists of a discrete sequence of "states" of the selection-oriented knowledge base whereby each state in the sequence reflects an improved level of knowledge and performance over the previous state. During each state, a separate state navigational archive is generated over the life cycle of that state. The information collected during a given state navigational archive provides the foundation to generate upgrades for the next state. Preferably, the minimum length of the life cycle of a state is determined by the amount of information that needs to be archived to satisfy sample size requirements for statistical analysis. The maximum length of the life cycle of a state can be determined by cost versus benefit analysis of potential upgrades waiting to be deployed, which may be a result of offline analysis of collected data.

The upgrades from one state to the next involve any changes that may be deemed appropriate to improve the operation of the selection-oriented knowledge base 130, and can include the following:
(1) Topological changes of the selection-on-vertex network such as addition, deletion, and reconfiguration of vertices, addition of new edges to create shortcuts and express paths, etc.
(2) Upgrades involving the title component of a vertex to resolve user misinterpretations uncovered from the analysis of HELP request reports and user suggestions.
(3) Upgrade of the presentation component of a vertex based on analysis of HELP request reports and user suggestions.
(4) Upgrade of the properties that characterize a class of data objects to resolve issues related to user interpretation diversities uncovered from the analysis of HELP request reports and user suggestions.
(5) Upgrade of the primary selection menu component of a vertex based on identified diversities of user interpretations of a menu selection, analysis of HELP request reports, and user suggestions.
(6) Upgrade of the details component associated with a selection vertex to correct and clarify issues that may have confused users.
(7) Upgrade of the confirmation component associated with a vertex to improve the summary statement based on user suggestions.
(8) Adjustments of the various configurable parameters of the selection-oriented knowledge base.

With respect to topological changes, the addition of express paths can be justified when the navigational archive of the current state indicates that a proper sub-path of a navigational path experiences very heavy traffic. In this case a shortcut can be created by the addition of a new edge that directly links the first and last vertices of the proper sub-path. This shortcut creates an express path which has two beneficial effects. First, the selection-oriented knowledge base operates faster. This is because the web pages associated with the intermediate vertices need not be displayed for all the users that follow the express path. Second, several frequently selected menu items that were presented to the user at a vertex located at the end of the express path can now be presented to the user sooner. The intelligent addition of express paths will tend to make the user's navigation faster and easier.

Another significant aspect of the learning phase is that all vertices are continuously monitored for the number of HELP requests they generate. At the end of the life cycle of each state, a number of vertices, denoted by "NT", with the highest incidence of HELP requests can be designated as "tagged".

The number NT is preferably configured to reflect the developmental resources that can be dedicated to upgrade tagged vertices. This approach establishes a priority system for the upgrade of vertices that optimizes the rate of improvement of the selection-oriented knowledge base, over time, for a given set of human resources participating in the upgrade.

When the upgrade work is declared complete for a given state a date and time can be selected for the transfer of the selection-oriented knowledge base from the current state to a new upgraded state. Once the new upgraded state is in effect a new state navigational archive is preferably started for the new sate. In addition a copy of the previous state navigational archive can be created and adjusted to reflect, to the extent possible, the data it would have contained had the upgrades introduced by the new state been in effect during the previous state. These adjusted state navigational archives can provide valuable data for the initial operation of the new state while the new state navigational archive has insufficient data to perform meaningful statistical analysis.

The upgrade of tagged vertices relies on the analysis of data associated with HELP requests. Preferably, live agents are instructed to collect information describing any reasons why the user encountered difficulties. The analysis tries to identify the potential deficiencies that triggered the requests. The analysis can focus on the class of data objects associated with the vertex that may need to be improved off-line to address the deficiencies. The analysis can also focus on either improving the definition of the data object associated with the vertex or spawning new vertices associated with new classes of data objects that may have to be created to properly address the deficiencies. The creation of new data objects may involve tests the user may be asked to perform to further narrow and identify the issue that confused the user.

Another significant aspect of the selection-oriented knowledge base 130, is a method for optimizing the mean navigation time (MNT) based upon the insertion of likely components and likely shortcut components in the web pages of vertices of the selection-oriented knowledge base 130. These insertions in turn depend on the values assigned to the reference variables RefP and RefS, defined earlier in this section.

The mean navigation time (MNT) can be expressed as an explicit function of the two independent variables RefP and RefS by an expression of the form MNT=f(RefP, RefS). In this expression, the reference RefP represents the value of a configurable multiple of the hit probability of a successor path of an evolving path above which the successor path is considered a likely successor path. Likewise, the reference RefS represents the value of a configurable multiple of the hit probability of a successor path of the evolving path above which the successor path is considered a likely successor shortcut.

In the three dimensional space (MNT, RefP, RefS) this function defines a surface which typically exhibits an absolute minimum corresponding to a value RefPmin for RefP and a value RefSmin for RefS. For a given evolving path, the variable RefP affects the number of successor paths that qualify as likely successor paths and the variable RefS affects the number of successor paths that qualify as likely successor shortcuts. The optimization involves identifying the optimum values RefPmin and RefSmin corresponding to a minimum mean navigation time (MNT).

In one embodiment, the optimization of the variables RefP and RefS is performed by a heuristic process whereby the variables RefP and RefS are initially set to very high values, RefP0 and RefS0 close to 100%. In view of the fact that RefP0 and RefS0 are very high, very few, if any of the successor paths will qualify to be displayed in the likely section or the likely shortcut section of the web page associated with the current vertex. As a result only those few users who follow the likely successor path or the likely shortcut experience a reduction in navigation time. The net effect on the mean navigation time (MNT) should be relatively small and may even be zero if no successor path qualifies as a likely successor path or as a likely shortcut for the initial values (RefP0, RefS0).

Figure 7:
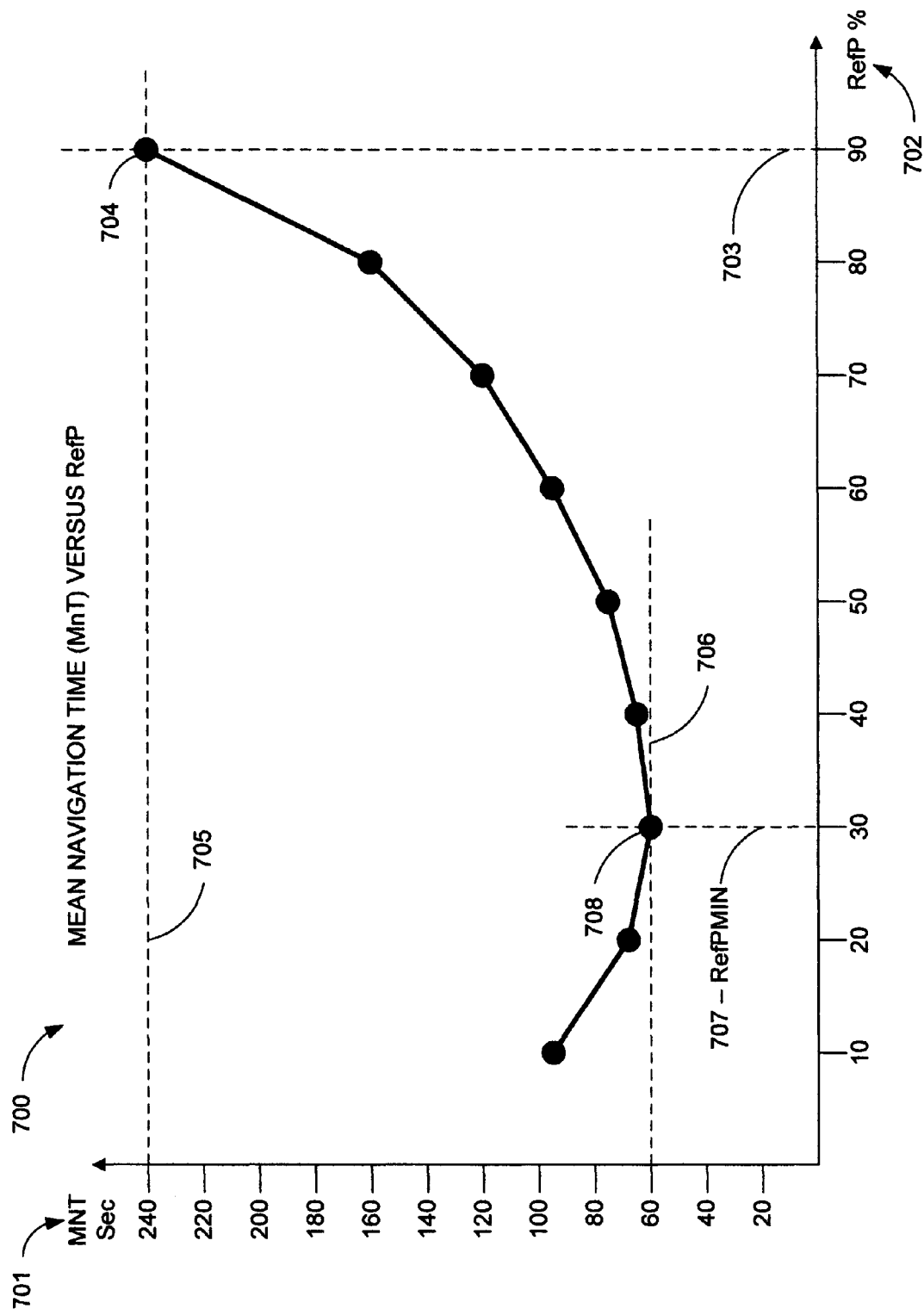
FIG. 7 shows an illustrative graph associated with a heuristic process to minimize the mean navigation time of the selection-oriented knowledge base.

FIG. 7 shows an illustrative graph 700 to facilitate the description of the heuristic process. For simplicity and ease of representation, the illustration of FIG. 7 only depicts a specific cross section of the (MNT, RefP, RefS) space by a plane defined for a specific value of the variable RefS. However, it is to be understood that a complete representation of the function MNT=f(RefP, RefS) would involve a sequence of parallel cross sections similar to graph 700, whereby for each cross section corresponds to a different value of RefS.

The illustration of FIG. 7 depicts the MNT axis 701, the RefP axis 702, and an initial value selected for RefP0 equal to 90% with a reference 703. The initial value selected for RefS0, not shown in FIG. 7, can also be 90%. After a sufficient statistical sample is collected for RefP0 and RefS0 both equal to 90%, the resulting mean navigation time (MNT) can be computed. The corresponding data point 704 is illustrated in graph 700 with the computed MNT equal to 240 seconds with a reference 705.

Next the value of RefP is decremented by a configurable value, DeltaRefP, and again a statistical sample is collected, from which a new MNT is computed. Because additional likely successor paths may be displayed more users may experience a reduction in search time and the MNT will tend to decrease as illustrated in FIG. 7. The steps of decrementing RefP, collecting a statistical sample of search times, and recomputing MNT are then repeated for as long as the value of MNT continues to decrease.

Eventually, after a number of repetitions of these steps the value of MNT starts to increase. This is because the number of likely successor paths displayed becomes so large that users waste more time reviewing long lists of likely successor paths than the time gained by following all the steps in a successor path.

The minimum mean navigation time (MNT) is represented in FIG. 7 by data point 708. For this data point, the value of RefP with the reference 707 is equal to 30% and the corresponding value of MNT is equal to 60 seconds with the reference 706. The value of RefP associated with the minimum MNT is vertex dependent and can vary significantly with the distribution of the hit probability for the set of successor paths of each evolving path. For a highly skewed distribution, such as for example one successor path has a 75% hit probability and five other successor paths have each a 5% hit probability, the value of RefP associated with the minimum MNT will tend to move towards a high value. For a very even distribution, such as for example a set of twenty successor paths with hit probabilities ranging between 4% and 6%, the value of RefP associated with the minimum MNT will tend to move towards a low value.

The selection-oriented knowledge base can automatically establish by successive approximations the values RefPmin and RefSmin corresponding to the minimum of the function MNT=f(RefP, RefS). After RefPmin and RefSmin are established, the selection-oriented knowledge base 130 can operate an automatic optimum seeking process that continuously monitors MNT for a range of RefP and RefS values around the established RefPmin and RefSmin to maintain MNT at the minimum value. Such seeking process can correct for changes in factors that may affect the MNT such as user behavior, fluctuations in user activity, trends, upgrades of the selection-oriented knowledge base, etc. In addition, the initial setup process can be repeated at regular intervals to ensure that the selection-oriented knowledge base is continually operating at minimum value of the mean navigation time.

Various heuristic strategies can be used to determine the minimum of the explicit function MNT=f(RefP, RefS), with respect to the two independent variables RefP and RefS. In one embodiment, the selection-oriented knowledge base can repeat the steps associated with FIG. 7 for each of a set of different values of RefS and from the collected data establish the values RefPmin and RefSmin. In another embodiment, the selection-oriented knowledge base can use a basic step sequence consisting of decrementing RefP, collecting a statistical sample of search times, and recomputing MNT followed by decrementing RefS, collecting a statistical sample of search times, and recomputing MNT. This basic step sequence can then be repeated until a minimum MNT is passed and eventually return back to the identified minimum with small increments of RefP and RefS.

Other embodiments may use a variety of alternatives to monitor and optimize the navigation time of the selection-oriented knowledge base such as for example an efficiency monitor based upon a moving average of the mean navigation time for every path in the navigational library and all such alternatives are within the scope of the invention.

III. Navigational Archive

The navigational archive module 131 is the repository for the navigation records of all the users that navigate the selection-oriented knowledge base 130. These records, which contain extremely valuable data, preferably include for each user that accesses the selection-oriented knowledge base, the following items:

(1) The date and time of access to the selection-oriented knowledge base 130.

(2) The user identification provided by the user during the registration process. This is not necessarily the user's name. Users that wish to remain anonymous do not need to provide personal information during the registration process, but need a user ID. Alternatively the user ID can be assigned by the selection-oriented knowledge base.

(3) The sequence of vertices visited by the user upon accessing the selection-oriented knowledge base 130. This sequence, called a path, starts at the root vertex 1806 and can end at any vertex.

(4) The path schedule expressed in terms of the arrival time at each visited vertex in the path, including the root vertex.

(5) If a "HELP" request is generated by the user at a current vertex, the identification of the vertex and the date and time the "HELP" request is generated.

(6) If a user clicks the "THAT'S IT" button at a current vertex, the identification of the vertex and the date and time of the button click.

(7) If a user clicks the "CONFIRM" button at a current vertex, the identification of the vertex and the date and time of the button click.

The navigational archive records are preferably stored in a database where they can be easily accessed for both off-line and real-time analysis. The user activity analyzer 132, the help requests predictor 133, and the people responsible for the upgrades of the selection-oriented knowledge base 130 are some of the more frequent users of the navigational archive 131. The navigational archive also provides very valuable information for research and analysis of user behavioral patterns.

As described in the previous section, during the learning phase a separate state navigational archive is created for each state of the learning phase. In one embodiment of this invention, these state navigational archives and the adjusted copies thereof discussed in the previous Section are all part of the navigational archive module 131.

IV. User Activity Analyzer

While the main purpose of the selection-oriented knowledge base 130 is to store knowledge related to data objects, the main purpose of the user activity analyzer 132 is to analyze user activities to develop knowledge. The knowledge is developed by first capturing and identifying certain user behavioral patterns and then translating the information obtained into useful knowledge.

The data stored in the navigational archive module 131 can be analyzed by the user activity analyzer 132 to produce information that can be used to improve the performance of the selection-oriented knowledge base 130. The analysis can be classified into two basic categories: off-line and real-time. The analysis can be tailored for each organization operating a selection-oriented knowledge base, although it should be similar for organizations in similar types of business.

The information produced by off-line analysis can include the following:
(1) Distributions of the number of selection-oriented knowledge base accesses in the calendar time domain. Examples are: the number of accesses for each hour of the day, day of the week, and week of the year, all expressed versus time. This item serves as a general monitor of activity.
(2) Distributions of the number of "HELP" requests for the entire selection-oriented knowledge base in the calendar time domain. Examples are: the number of "HELP" requests for each hour of the day, day of the week, and week of the year. This item serves as a monitor of the performance of the selection-oriented knowledge base. As the selection-oriented knowledge base evolves from state to state, the number of "HELP" requests should decrease significantly.
(3) Distributions of the frequency of "HELP" requests in the calendar time and vertex domains. Examples are: the frequency of "HELP" requests for each individual vertex, expressed in requests per unit of time over given calendar time periods. These distributions can be used in particular to select vertices to be tagged for upgrade.
(4) Distributions of the length of voice service sessions associated with each "HELP" request in the vertex domain. Examples are: the length of each voice service session associated with a "HELP" request for each individual vertex. This item can be used to estimate the number of agents required to maintain the response to "HELP" requests below the maximum acceptable response time (MART).
(5) Distribution of outcomes for each navigation of the selection-oriented knowledge base in the calendar time domain. These outcomes can be expressed as a successful navigation without the use of a "HELP" request, a successful navigation with the use of a "HELP" request, and an unsuccessful navigation.
(6) Distributions of navigational path usage in the navigational path domain.
(7) Distributions of path schedules in the navigational path domain.
(8) Distributions of HELP requests in the vertex domain.
(9) Hit probability tables in the evolving path/potential path and/or evolving path/successor path domains. For each possible evolving path in the selection-oriented knowledge base, these tables store for each possible potential path and/or successor path of the evolving path, the hit probability of the potential path and/or successor path.

The information produced by real-time analysis can include the following:
(1) Potential path identification whereby the evolving path is compared with navigational paths from the navigational library to identify those for which the evolving path is a proper sub-path.
(2) Discernable path recognition, whereby the evolving path is analyzed to determine if it is a discernable path.
(3) Prediction of the path schedule of a potential path of a user navigating the selection oriented knowledge base whereby the path schedule associated with the evolving path of the user is compared with the distribution of the path schedules of the potential path from the navigational library to identify the most likely path schedule the user is following.
(4) Prediction of the path schedule of a successor path of an evolving path of a user navigating the selection oriented knowledge base whereby the path schedule associated with the evolving path is compared with the distribution of the path schedules of potential paths of the evolving path from the navigational library to identify the most likely path schedule the user will be following.
(5) Computation of priority for HELP requests. This computation is used to determine if a user has earned sufficient priority to qualify for priority access to a live agent, as described later in this section.

A significant aspect of this invention is the seamless integration of the selection-oriented knowledge base and the live agent to help a user express a concept formed in the user's mind. This can be accomplished by the HELP request option, which allows the customer service agent to take over, almost instantly, after the selection-oriented knowledge base runs out of resources to help the user express a concept formed in the user's mind. More precisely, it is the selection-oriented knowledge base that needs HELP from a live agent to complete the task the selection-oriented knowledge base is expected to perform.

However, the instant take over by an agent could create a potential problem whereby the selection-oriented knowledge base could become victim of frivolous use of the HELP button as a shortcut to get quick access to a live agent. For example, a user could access the selection-oriented knowledge base, visit one vertex and immediately click the HELP button without giving the selection-oriented knowledge base the opportunity to help the user locate a data object reflective of a concept formed in the user's mind. To protect against such frivolous use and motivate the user to make an honest effort to navigate the selection-oriented knowledge base before resorting to the HELP button, the HELP request option can be operated in conjunction with an incentive algorithm.

The incentive algorithm can reward the users that make the biggest effort by responding faster to their HELP requests. The algorithm can rely upon a quantifiable measure of the amount of effort made by the user to navigate the selection-oriented knowledge base. This quantifiable measure, called the "search effort", is first translated by the algorithm into a priority level, which is then assigned to the help request.

In one embodiment, the search effort is measured in terms of the number of vertices visited.

In another embodiment, the search effort is measured in terms of the number of vertices visited and the total time spent to reach the current vertex, in accordance with a formula such as:

[search effort]=[evolving path length]×(1+[current navigation time]/[mean navigation time])

This formula attempts to make the search effort relatively independent of the level of computer expertise of the user except in extreme cases. For a user with average expertise the current navigation time should be approximately equal to the mean navigation time, thus reducing the search effort formula to the simpler expression [search effort]=2×[evolving path length] or twice the number of vertices visited. For an expert user the current navigation time should be smaller but the evolving path length should be larger and for a user with little expertise the current navigation time should be larger but the evolving path length should be smaller. As a result the impact of the user's expertise should be minimized. However, should a malicious user try to repeatedly click the first selection of each menu encountered to built up priority, it would take almost twice as many clicks as a well intentioned user. Likewise a user that clicks one selection and then waits for priority to built-up would have a long wait.

The range of anticipated values for the search effort can be divided into contiguous sub-ranges which can be mapped one-to-one to a finite set of priority levels. These priority levels can then be mapped one-to-one to priority service queues managed by the service agents scheduler 134. Table 800 of FIG. 8 provides an illustration of such mapping. This table assumes a typical navigation time of 15 seconds per vertex and is based on the case where the current navigation time is equal to the mean navigation time. Under these conditions, the search effort becomes equal to twice the number of vertices visited.

Row 801 shows an example of search effort sub-ranges, from less than 10 to over 80. Row 802 shows a typical number of vertices visited by the user at the time the HELP button is clicked. Row 803 shows typical search times ranging from less than 1 minute and 15 seconds to over 10 minutes. Row 804 shows priority levels ranging from L1 to L6. The search efforts of row 801 are mapped to these priority levels. Finally, row 805 shows the priority service queues that are mapped to the various priority levels. Each of these queues is characterized by a maximum acceptable response time (MART) to respond to a HELP request. These queues need to be adequately staffed to ensure that the MART specification is respected.

In one embodiment, when the priority level is equal to L1, the user does not qualify for service under one of the priority queues as indicated by the not applicable (NA) label on row 805 of table 800. This is to preclude abuse of the HELP button as previously noted.

V. Help Requests Predictor

The help requests predictor 133 is a module that predicts forthcoming HELP requests. This module can use the data in the navigational archive 131 and the analysis generated by the user activity analyzer 132 to predict, in real-time, the probability that a user positioned at a current time at a current vertex will generate at a later time a "HELP" request at a given successor vertex as the user navigates through the selection-oriented knowledge base 130. This probability can be used by the help requests predictor 133, to generate a look-ahead demand matrix of the anticipated agents needed versus vertex and time. This matrix can be updated frequently and then transmitted to the service agents scheduler 134 which can alert demand agents to be ready to promptly reply to anticipated "HELP" requests.

Figure 9:
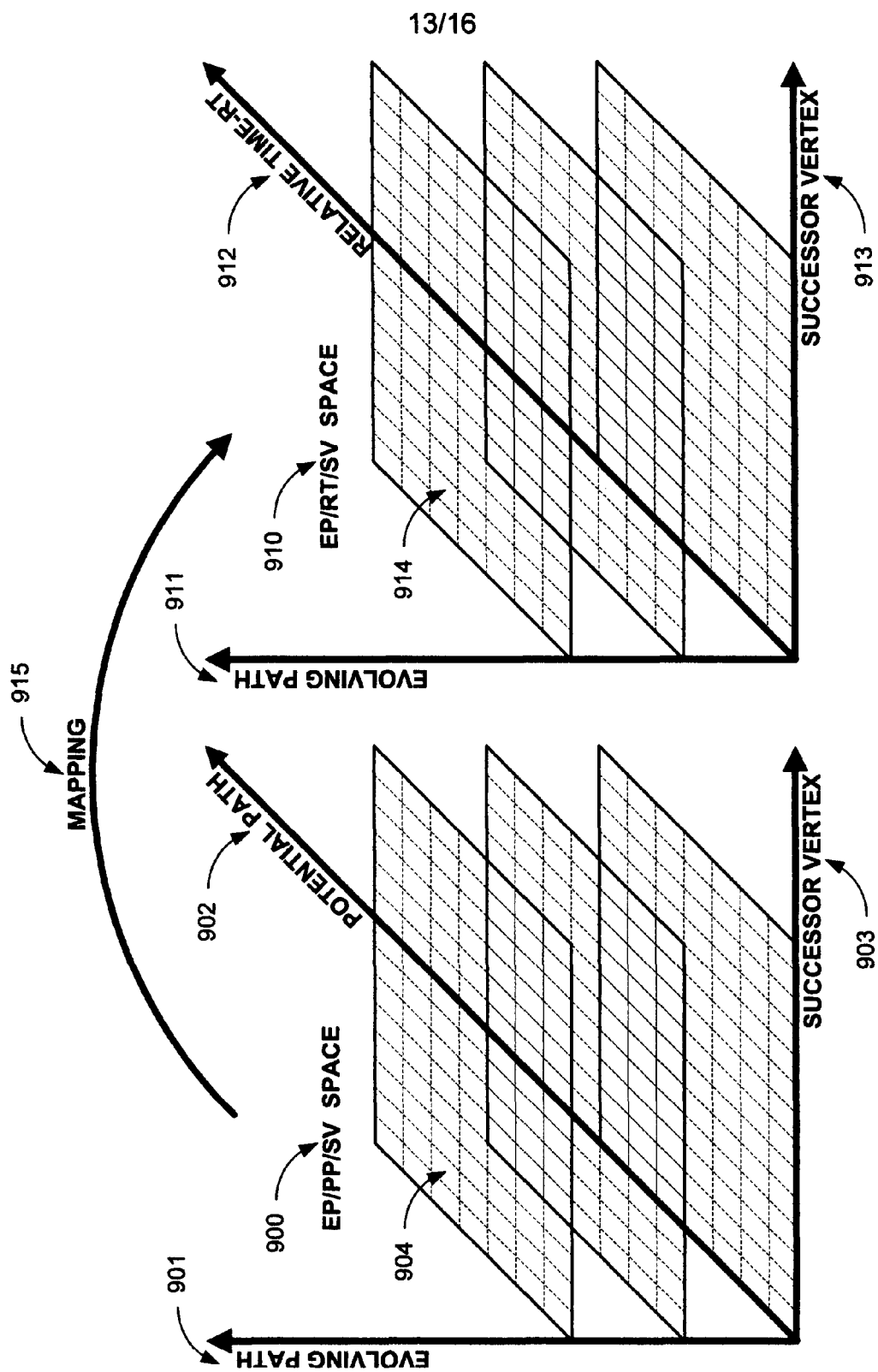
FIG. 9 depicts an illustrative mapping of a three dimensional evolving path/potential path/successor vertex space onto a three dimensional evolving path/relative time/successor vertex space.

One significant aspect of the help requests predictor is a help request probability database (HPD) derived from data stored in the navigational archive 131. FIG. 9 shows an illustration of a finite three dimensional matrix, designated as the EP/PP/SV space for the convenience of this description. This space, defined by the parameters evolving path 901, potential path 902, and successor vertex 903, can help describe how the help request probability database (HPD) can be generated. Each point of the EP/PP/SV space can be derived from the topology of the selection-on-vertex network, once that topology is established whereby each parameter of the EP/PP/SV space has a finite range. The total number of evolving paths, the total number of potential paths, and the total number of vertices in the selection-on-vertex network determine the respective ranges of these parameters.

For a user navigating the selection-oriented knowledge base, the evolving path 901 defines the current position of the user at a current vertex at the end of the evolving path. Each potential path 902 of the evolving path defines a possible route the user may follow to visit a sequence of different successor vertices 903. The EP/PP/SV space represents all the possible combinations of evolving path, potential path, and successor vertex definable in the selection-on-vertex network.

Given a current vertex of an evolving path, a potential path of the evolving path, and a successor vertex of the current vertex (located on the potential path of the evolving path), the help probability database (HPD) can store a group of "n" pairs of values $(P_i, RT_i)$ where the index "i" has a range from "1" to "n". The value of "n" is specific to the group and depends on the particular evolving path (EP), potential path (PP), and successor vertex (SV) parameters.

For each pair of the group of "n" pairs, the value $RT_i$ represents a unitary segment of time expressed in time units (TU) relative to a current time at the current vertex during which a probable HELP request may occur at the successor vertex. The variable $P_i$ represents the probability that the HELP request will be generated at the successor vertex during the unitary segment of time $RT_i$. Because users tend to navigate at different speeds, the group of pairs of values $(P_i, RT_i)$ represents a distribution of probability versus time unit (TU).

To illustrate, assume the Evolving Path is EP1355, the current vertex is V 134, the Potential Path is PP5193, and the Successor Vertex is V296. Assume further that RT is measured in time units of 10 seconds, such that (RT=1) represents the segment from >0 to 10 seconds, (RT=2) represents the segment from >10 to 20 seconds, (RT=3) represents the segment from >20 to 30 seconds, etc. An example of a group of three pairs of variables stored in the HELP Probability Database for the point (EP1355, PP5193, V296) could be:

(1) $(P_1, RT_1)$=(0.00068, 6), indicating that during time unit $RT_1$=6 (from >50 to 60 seconds) there is a 0.068% probability that a user currently on evolving path EP1355 at vertex V134 will generate a HELP request at vertex V296 of potential path PP5193.

(2) $(P_2, RT_2)$=(0.00137, 7), indicating that during time unit $RT_2$=7 (from >60 to 70 seconds) there is a 0.137% probability that a user currently on evolving path EP1355 at vertex V134 will generate a HELP request at vertex V296 of potential path PP5193.

(3) $(P_3, RT_3)$=(0.00043, 8), indicating that during time unit $RT_3$=8 (from >70 to 80 seconds) there is a 0.043% probability that a user currently on evolving path EP1355 at vertex V134 will generate a HELP request at vertex V296 of potential path PP5193.

Each probability $P_i$ of the group of pairs $(P_i, RT_i)$ associated with each point of the EP/PP/SV space can be derived from statistical analysis of the data stored in the navigational archive 131. Each time $RT_i$ of the group of pairs $(P_i, RT_i)$ associated with each point of the EP/PP/SV space can be estimated by two operations. The first operation is adding the following two values:

(1) A navigation time $(NT_i)$ associated with the pair $(P_i, RT_i)$, which can be derived from statistical analysis of the data stored in the navigational archive 131.

(2) A help generation time $(HGT_i)$ associated with the pair $(P_i, RT_i)$, which can be derived from statistical analysis of the data stored in the navigational archive 131. The second operation is to convert the above sum into time units (TU) to obtain the value of $RT_i$.

To illustrate, assume again the Evolving Path is EP1355, the current vertex is V134, the Potential Path is PP5193, and the Successor Vertex is V296. In the case of the pair $(P_2, RT_2)$, if the navigation time $(NT_2)$ from vertex V134 to vertex V296 is 57 seconds and the help generation time $(HGT_2)$ at vertex V296 is 9 seconds, the sum of these two times is 66 seconds, which falls between >60 and 70 seconds and equates to the value of 7 for $RT_2$.

For speed of execution, the EP/PP/SV space can be mapped onto another finite three dimensional space, called the EP/RT/SV space, in which the parameter potential path (PP) is replaced by the relative time RT. In this space the range of the parameter RT (rangeRT) can be determined by adding the longest navigation time and the longest help generation time found in the navigational archive 131.

The mapping of the EP/PP/SV space onto the EP/RT/SV space can be performed by executing the following process for each (evolving path, successor vertex) pair:

(1) In the EP/PP/SV space, identify the group of all the points for a given (evolving path/successor vertex) corresponding to different potential paths and for each point of these points identify the group of pairs $(P_i, RT_i)$ associated with the point.

(2) Combine all the identified pairs $(P_i, RT_i)$ in a combined group.

(3) Partition the combined group of pairs $(P_i, RT_i)$ into distinct subgroups such that each subgroup contains all the pairs $(P_i, RT_i)$ with the same value of RT.

(4) For each subgroup calculate the sum SP of all the values of P in the subgroup.

(5) Associate with each point in the EP/RT/SV space, defined by an evolving path, a value of RT, and a successor vertex, the sum SP calculated above corresponding to the subgroup associated with the subject value of RT.

FIG. 9 shows an illustration of the above mapping. On the left, the EP/PP/SV space 900 is defined by the parameters evolving path 901, potential path 902, and successor vertex 903. On the right, the EP/RT/SV space 910 is defined by the parameters evolving path 911, relative time 912, and successor vertex 913. FIG. 9 also shows on the left several (potential path/successor vertex) planes 904 and on the right several (relative time/successor vertex) planes 914, which represent two dimensional matrices. The mapping 915 uses the mapping function defined above to map the EP/PP/SV space 900 onto the EP/RT/SV space 910.

The EP/RT/SV space 910 includes all the possible combinations of the parameters Evolving Path, RT, and Successor Vertex, and for each combination provides the sum SP of the probabilities that a HELP request will be generated. Preferably, the EP/RT/SV space 910 is derived from statistical analysis of the data stored in the most recent state navigational archive and needs to be updated whenever the selection-oriented knowledge base transitions from one state to the next as described in Section-II. However, between updates the EP/RT/SV space can be considered static.

Figure 10:
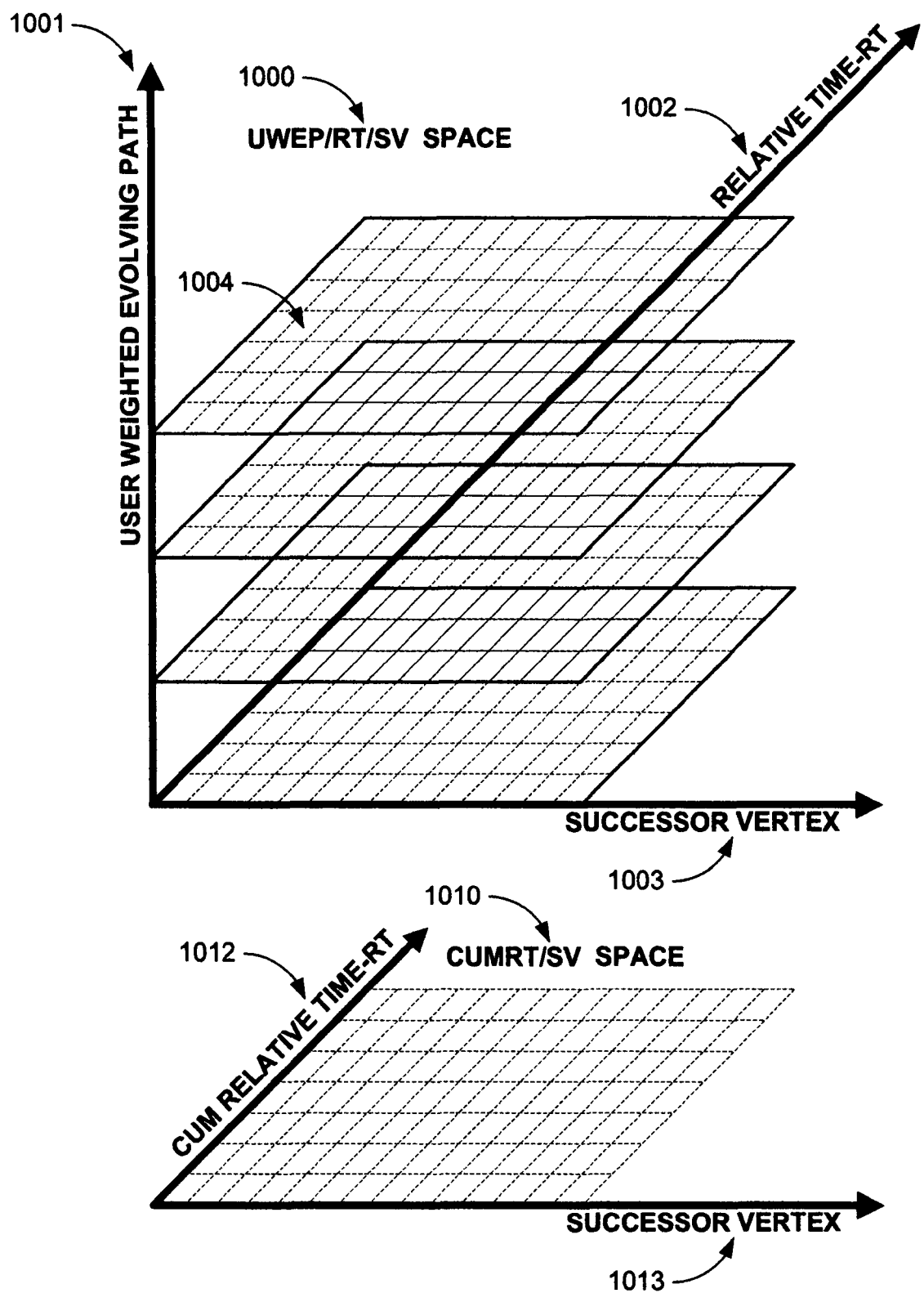
FIG. 10 depicts an illustrative three dimensional user weighted evolving path/relative time/successor vertex space and a two dimensional cum relative time/successor vertex space.

The prediction of HELP requests for all active users navigating the selection-oriented knowledge base can be performed in real-time by a user-weighted dynamic version of the EP/RT/SV space. FIG. 10 illustrates this space called UWEP/RT/SV space 1000, which is also a three dimensional matrix. Each user-weighted evolving path in this space is associated with two items. The first is a list containing the identification of every active user currently on that user-weighted evolving path. The second is the count of the number of users on the list, called the weight of that user weighted evolving path.

As a user moves from a vertex "X" to a vertex "Y", the user also moves from a user-weighted evolving path "X" to a user-weighted evolving path "Y". At the same time the identification of the user is transferred from the list associated with the user weighted evolving path "X" to the list associated with the user weighted evolving path "Y". Also at the same time, the weight of the user weighted evolving path "X" is decremented by one and the weight of the user weighted evolving path "Y" is incremented by one.

FIG. 10 shows the UWEP/RT/SV space 1000, the user weighted evolving path axis 1001, the relative time-RT axis 1002, the successor vertex axis 1003, and several (relative time/successor vertex) planes 1004. The complete set of all the (relative time/successor vertex) planes constitutes a three dimensional matrix. A vertical column in this matrix contains, at the intersection with each plane corresponding to a user weighted evolving path, the sum SP associated with the respective pair of values (relative time, successor vertex).

FIG. 10 also shows a two dimensional space designated as CUMRT/SV space 1010, including the associated relative time-RT axis 1012, and the associated successor vertex axis 1013. This space constitutes a two dimensional matrix in which each element is the user weighted sum of the corresponding column in the UWEP/RT/SV space 1000. Such user weighted sum is computed by summing, over the column, the values of SP multiplied by the weight of the respective user weighted evolving path.

The CUMRT/SV space is a complete representation of the sum of probabilities for HELP requests in the (relative time/successor vertex) domain. In this space, the elements of the two dimensional matrix are sums of probabilities which represent an expected demand, called the demand factor, for live service agents at the element corresponding to that relative time and successor vertex pair.

To illustrate, assume that for an RT=7 RTU and successor vertex=SV296, the entry is demand factor=4.38 agents. This demand factor can be expressed by the sum (1+1+1+1+0.38). In this sum each value 1 can be interpreted as representing a sum of probabilities that equals to 1, indicating that one agent is expected to be needed to service the users associated with the probabilities in that sum of one. With respect to the value 0.38 it can be interpreted as indicating that 0.38 agents are necessary to satisfy this portion of the demand factor. Depending upon the circumstances, the service agents scheduler 134 may determine that an additional agent is required to satisfy this portion of the demand factor. Alternatively, the service agents scheduler 134 may combine the 0.38 portion of the demand factor with portions of demand factors associated with other elements of the matrix with the same relative time (RT), to allocate an additional agent.

As users navigate through the selection-oriented knowledge base they progress from one user weighted evolving path to another in the UWEP/RT/SV space 1000. In this space, each (relative time/successor vertex) plane 1004 provides a complete matrix of the probabilities that a user currently listed on the corresponding user weighted evolving path will generate a HELP request at a successor vertex during some future time unit (TU).

The transfers of user identifications from one user weighted evolving path to another and the updates of the respective weight of each user weighted evolving path can be executed at regular update intervals. The update interval can be used to synchronize the computational tasks associated with these updates, as explained below with reference to FIG. 10.

The CUMRT/SV space 1010 needs to be frequently updated to reflect asynchronous movements of active users from one vertex to another. In one embodiment, the update is performed at the end of each consecutive update interval using two buffers denoted "update buffer A" and "update buffer B" to facilitate the description. During one update interval, all the user movements received by the web server 104 are stored by the help requests predictor 133 in "update buffer A" to be executed at the end of that update interval. During the next update interval, all the user movements received by the web server 110 are stored by the help requests predictor 133 in "update buffer B" to be executed at the end of the next update interval.

While "update buffer A" is receiving data, the user movements in "update buffer B" are processed to update the CUMRT/SV space 1010. This processing involves the following steps:

(1) Reflect each user movement in the UWEP/RT/SV space 1000 by adding that user's identification to the post-movement user weighted evolving path and deleting it from the pre-movement user weighted evolving path.

(2) Compute the revised weight of each user weighted evolving path.

(3) Perform the calculation of the weighted sum of each column in the matrix of UWEP/RT/SV space 1000.

(4) Store the calculated weighted sums of each column.

(5) Empty the corresponding update buffer.

At the end of the update interval, "update buffer B" starts receiving data while the data stored in "update buffer A" is processed. The update interval between consecutive updates of the CUMRT/SV space 1010 needs to be at least longer than the time required for the execution of the five steps listed above, which at present computer speeds should be in the order of a fraction of a second. As a practical matter, the update interval could be as much as 10 seconds because the service agents scheduler 134 does not need more frequently updated forecasts to operate efficiently. The update interval can also be a configurable parameter which can be optimized for each specific implementation.

VI. Service Agents Scheduler

The service agents scheduler 134 is the module that coordinates and manages live service agents and schedules their activities. As described in Section N with reference to FIG. 8, one aspect of this invention relates to an incentive algorithm that rewards the users that make the biggest effort to navigate the selection-oriented knowledge base by responding faster to their HELP requests. The operation of the incentive algorithm relies in part on the use of multiple priority queues whereby the number of agents assigned to each priority queue is adjusted dynamically to ensure that the response time for each priority queue does not exceed a critical configurable limit associated with that priority queue, called the maximum acceptable response time (MART).

The service agents scheduler 134 can operate under a resource reallocation rule whereby a service agent allocated to a given priority queue can always be reallocated to a higher priority queue to ensure that the maximum acceptable response time (MART) of the higher priority queue is not violated.

The higher priority queues are directed to users that have diligently tried to navigate the selection-oriented knowledge base and have encountered difficulties. The effort spent by these users most likely represents valuable information that needs to be captured to improve the performance of the selection-oriented knowledge base. This is why the MART values for the higher priority queues should be set to relatively short durations.

In contrast, the lower priority queues are directed to users that spent very little effort navigating the selection-oriented knowledge base and therefore are less likely to have valuable information that needs to be captured. This is why the MART values for the lower priority queues can be set to relatively longer durations. In addition, the service agents scheduler 134 can be configured with the flexibility to adjust the MART of the lowest priority queue to long durations to accommodate a sudden unexpected rise in volume of HELP requests, whereby most of agents of the lowest priority queue may have to be reallocated to higher priority queues.

Based upon statistical analysis of the data stored in the navigational archive 131, the service agents scheduler 134 can develop reasonably accurate projections of the total number of agents needed to meet the priority queue requirements shown in Table 800 of FIG. 8. For example, these projections can be detailed to include the agents required by each priority queue for each 15 minutes of the hour, each hour of the day, day of the week, and week of the year. If applicable, such projections can also detail the type of agent in terms of topic of expertise. The topic of expertise can be further expressed by the vertices of the selection-on-vertex network for which the agent is certified to provide assistance to users. Preferably, most implementations maintain a matrix of agents versus the vertices for which each agent is certified, whereby this matrix can be used by the service agents scheduler 134 to ensure that a qualified agent is allocated to each case.

One aspect of this invention relates to the use of two types of agents to minimize the labor costs associated with service agents and provide the flexibility to dynamically adjust agent resources to meet demand fluctuations in real-time. Preferably, the first type called scheduled agent is an agent that works a regular schedule and is paid for the scheduled time. Scheduled agents can be certified in any number of vertices and can be scheduled based upon their respective vertices of expertise. Preferably, the second type called demand agent is an agent that signs up, on short notice, for time-slots that need to be covered and is only paid for the time-slots worked. Demand agents should be registered with the service agents scheduler 134, and should be certified in at least one vertex.

Figure 11:
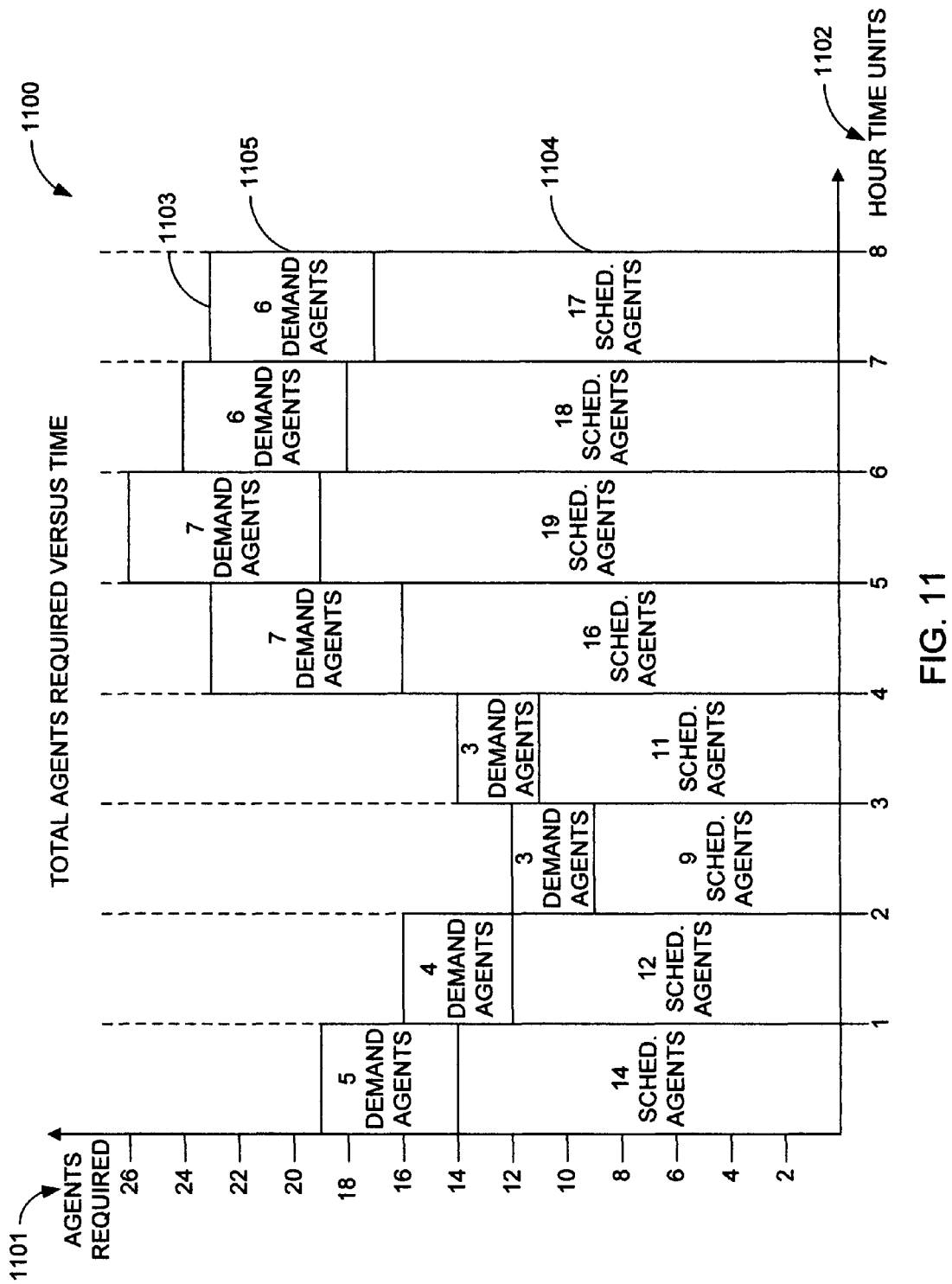
FIG. 11 shows an illustrative plot of agents required during each scheduling time-segment of one hour versus time expressed in hour time units.

In one embodiment, the scheduling of the two types of agents is coordinated in accordance with a method described with reference to FIG. 11. This figure shows an illustrative plot 1100 of agents required 1101, during each time-segment of one hour, versus time expressed in hour time units 1102.

To ensure that a sufficient number of agents will be available for a particular time-segment, the total number of agents required per vertex can be set to an expected value derived from statistical analysis of historical data plus a margin of error of that expected value. Of the total number of agents required per vertex, a number equal to the expected value minus the margin of error can consist of scheduled agents and a number equal to twice the margin of error can consist of demand agents. In these computations, the numbers for both types of agents are rounded to the ceiling of the computed value.

Using this strategy, the scheduled agents have approximately 100% probability of being continuously busy despite the finite margin of error. The demand agents, which are not expected to work continuously, cover the margin of error. In the example of FIG. 11, the time-segment 1103 covering the hour time unit from 7 to 8 requires a total of 23 agents consisting of 17 scheduled agents 1104 and 6 demand agents 1105.

Figure 12:
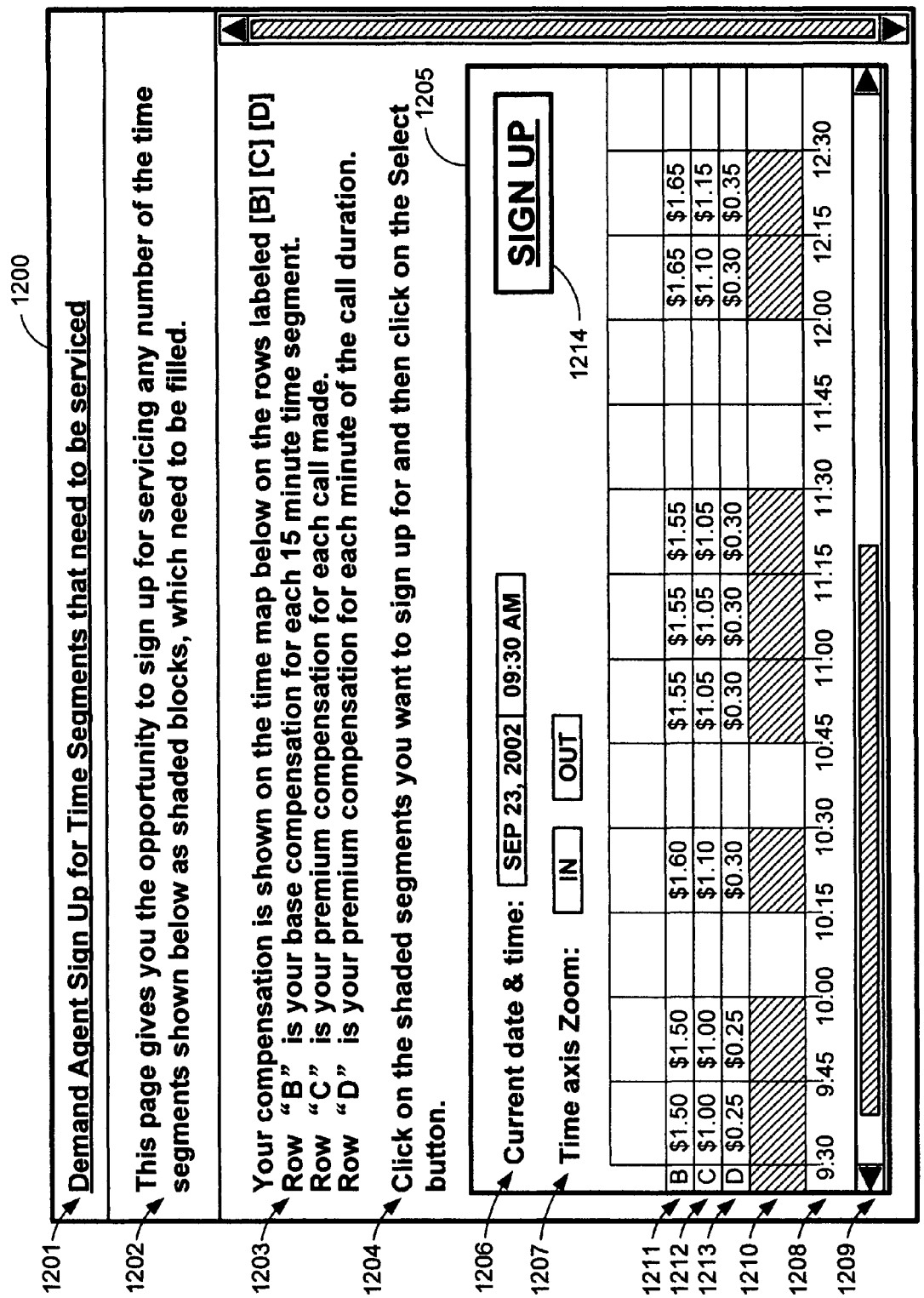
FIG. 12 shows an exemplary web page that can be used for demand agents to sign up for 15 minute time-slots.

In one embodiment, the demand agents can sign up for specific time-slots of the time-segments that need to be covered. FIG. 12 shows an example of a web page 1200 that can be used for demand agents to sign up for these time-slots. It displays the title of the web page 1201, a statement explaining the purpose of the web page 1202, an explanation of the compensation schedule 1203, a statement explaining how to sign up 1204, and a window with a real-time map of the time-slots of the time-segments that need to be covered 1205.

According to the example, the window 1205 contains a field for the current date and time 1206, "IN" and "OUT" buttons for time axis zoom 1207, a time axis 1208, a time scroll bar 1209, and displays the time map with a row of cross hatched time-slots 1210 that need to be covered by demand agents. In this example the time-slots 1210 are 15 minutes in duration. However, the duration of the time-slots is preferably a configurable parameter that is adjusted for each specific set of circumstances. In addition, the window 1205 shows three rows labeled "B" 1211, "C" 1212, and "D" 1213 that display the applicable components of the compensation schedule for each time-slot.

The demand agents that wish to sign up for time-slots of the time segments to be serviced after receiving an alert from the service agents scheduler 134, can logon to the web site 120, click on the desired time slots to select them, and click on the SIGN UP button 1214 to confirm their selections.

Preferably, the compensation of the demand agents is based upon an algorithm that provides the needed incentive to ensure best performance at minimum cost. In this example the web page displays for each of the time-slots shown, a base compensation (B), a premium for each call (C) serviced, and the premium for each minute of a cumulative duration (D) of calls serviced. This algorithm has the flexibility to automatically adjust the three components of the compensation to optimize the incentive.

Based upon this algorithm, agents are motivated not to extend the service calls beyond a reasonable limit as it could be the case if the compensation was based strictly on call duration. Agents are also motivated to spend sufficient time with the customer which might not be the case if the compensation was based strictly on the number of calls serviced. The service agents scheduler 134 can maintain a data base of the number of agents who sign up for time-slots versus the three components of the compensation, the time of the day, and the day of the week. From this data base, the service agents scheduler 134 can develop a function expressing the number of agents that sign up for time slots versus each the three components of compensation for the various times of the day and days of the week. This function can then be used to automatically adjust the compensation components.

The demand agents can pre-register for periods of time during which they may be interested in signing up for potential time-slots to be serviced. The demand agents can also be equipped with a paging device through which the service agents scheduler 134 can alert these agents that certain time-slots in the forthcoming hours need to be filled. The service agents scheduler 134 can display updates of the demand agents sign up web page at regular pre-specified times such as every 15 minutes.

The service agreement for demand agents can provide for these agents to have their computer continuously logged on to the web site 120 during the time-slots for which they signed up. Further the agents must be available to receive and acknowledge instructions that may be provided to them via their web browser 151. Such instructions can include all the pertinent information about the user to be assisted and the time when the assistance is required.

After the agent acknowledges receipt of the instructions, the service agents scheduler 134 can automatically place a phone call to the user on the behalf of the agent. If the call is answered by the user, the agent assists the user and enters the required information on the web browser. If the user does not answer the call, the agent reports on the web browser the unsuccessful attempt to reach the user and waits for further instructions.

The demand agent positions can be efficiently filled by retired people that enjoy working part-time from home to preserve their mental alertness and earn some extra income. The strategy described above offers retirees the opportunity to work flexible hours at their convenience and the opportunity to monetize valuable skills and knowledge acquired during years of experience in the labor force. Retired people represent an important economic resource that is mostly wasted and if properly utilized can bring significant benefits to both the population of retires and to the economy.

VII. Conclusion

While certain preferred embodiments have been described and shown in the accompanying drawings, it is to be understood that such embodiments are merely illustrative of, and not restrictive on, the broad invention. Other embodiments that are apparent to those of ordinary skill in the art, including embodiments that do not provide all of the features and advantages set forth herein, are also within the scope of this invention. Further, it is to be understood that this invention is not limited to the specific construction and arrangements shown and described since various modifications or changes may occur to those of ordinary skill in the art without departing from the spirit and scope of the invention. Accordingly, the scope of the invention is defined by the claims that follow. In the claims, a portion shall include greater than none and up to the whole of a thing. In the method claims, reference characters are used for convenience of description only, and do not indicate a particular order for performing the method.

What is claimed is:

1. An Internet-based computer-assisted method for generating a static taxonomy of classes of data objects representing a knowledge base that provides on a server a navigable network structure configured to construct a query, wherein a user communicates with the server via a web browser and the construction of the query is based at least upon knowledge captured by the knowledge base as a result of a sequence of selection steps executed by the user in connection with a navigation of the network structure, wherein at each selection step a choice of classes of data objects is presented to the user, the method comprising:

providing on a server a navigable network structure comprising a plurality of unique nodes and links configured to present to a user, in one or more web pages of a web browser, a static taxonomy of classes of data objects representing a knowledge base, wherein:
- the static taxonomy starts with a static taxonomy setup state based upon existing available knowledge, wherein the static taxonomy setup state provides a seed configuration for a subsequent evolution of the static taxonomy;
- the static taxonomy setup state is followed by a learning phase, comprising a finite sequence of additional static taxonomy states;
- each static taxonomy state in the sequence reflects an improved level of knowledge and performance of the static taxonomy over previous static taxonomy states;
- each static taxonomy state in the sequence is associated with a life cycle during which navigational data is archived, wherein the navigational data provides the foundation to generate upgrades for a subsequent static taxonomy state and wherein the length of the life cycle of each static taxonomy state is based at least upon the time required to collect a sufficient amount of navigational data consistent with sample size requirements for statistical analysis;
- each static taxonomy state in the sequence is associated with the subsequent static taxonomy state, which is configured off-line during the life cycle of the static taxonomy state, based at least upon the generated upgrades;
- each static taxonomy state in the sequence is associated with a selected date and time for a transition from the static taxonomy state to the subsequent static taxonomy state;
- a last static taxonomy state of the learning phase occurs when the static taxonomy has evolved to a point wherein no further knowledge needs to be added for an efficient operation of the static taxonomy;
- the last static taxonomy state of the learning phase is followed by a maintenance taxonomy state limited to edits and updates, which may be required to reflect any changes in the environment in which the static taxonomy operates including changes in user behavior; and
- each node of the plurality of nodes in each of the static taxonomy states of the static taxonomy:
  - is uniquely identified;
  - is associated with a class of data objects;
  - provides in the one or more web browser pages a presentation of the class of data objects associated with the node, wherein the presentation comprises characteristics of the class of data objects associated with the node;
  - provides access to a user-exercisable option for the user to indicate acceptance of the class of data objects associated with the node; and
  - provides access to a user-exercisable option for the user to request help from a live agent;

for each state of the finite sequence of static taxonomy states, accumulating navigational data for each navigation of a plurality of navigations performed over the life cycle of the static taxonomy state, wherein the navigational data comprise, for each node visited sequentially in the course of each navigation:
- a node identifier;
- a user identifier;
- a time stamp identifying an arrival time of the user at the node; and
- help request data, if the user exercisable option to request help from a live agent is exercised, wherein the help request data comprise:
  - a time stamp identifying a time when the help request is exercised;
  - a session time, wherein the session time comprises a length of time of a communication session between the user and the live agent; and
  - at least one reason why the help request was exercised;

for each state of the finite sequence of static taxonomy states, based at least on the accumulated navigational data collected over the life cycles of previous static taxonomy states, predictively scheduling live agents to respond to help requests within a programmable maximum acceptable response time after the help request is exercised;

in response to receiving from a user visiting a node an indication of acceptance of the class of data objects associated with the node, constructing a query based at least on a sequence of selection steps executed by the user;

for each static taxonomy state of the finite sequence of static taxonomy states, based at least on the accumulated navigational data, and the selected date and time for a transition from the static taxonomy state to a subsequent static taxonomy state, executing the transition to the subsequent static taxonomy state; and repeating the steps of accumulating navigational data and transitioning to the next static taxonomy state until the maintenance state is reached.

2. The method of claim 1, wherein the programmable maximum acceptable response time can be cost effectively set to a value proximate to zero seconds.

3. The method of claim 2, wherein predictively scheduling agents to respond to exercised help requests within a programmable maximum acceptable response time after the help request is exercised, comprises:
- identifying a time unit, wherein the time unit is used to express a lapse of time in finite increments of one time unit;
- identifying a time range consisting of a finite number of time units;
- for each current user of a plurality of current users navigating the navigable structure during a current time unit, wherein the current user is positioned at a current node, expressing in time units, a time relative to the current time when the current user may exercise the option to request help from a live agent at some subsequent node;
- for each time unit of the time range, computing for said each current user of a plurality of current users a statistical probability that the current user will exercise the help request during the time unit while visiting the subsequent node, based at least on accumulated navigational data for past users and the navigational data for the current user;
- associating the statistical probability with said each current user, said subsequent node, and said time unit;
- for each node in the navigable structure and for each time unit of the time range, computing a sum of the statistical probabilities associated with each current user of said plurality of current users navigating the navigable structure;

associating with each agent a non-empty set of nodes of the network for which the agent is qualified to respond to a help request;

based at least on the navigational data accumulated for past users and said sum of statistical probabilities, computing a forward looking agent demand matrix over the time range of agents necessary to respond to help requests from said each current user versus node and time unit, wherein the forward looking agent demand matrix comprises an expected minimum and an expected maximum number of agents, taking into consideration that each agent may be qualified in more than one node;

identifying an update interval of time for updating the agent demand matrix, as users move from node to node while navigating the navigable structure;

updating the forward looking agent demand matrix of agents at the expiration of each update interval of time;

identifying a set of agent scheduling time segments; and for each time segment of the set of agent scheduling time segments, providing at least two types of agents to respond to help requests in compliance with the demand matrix, wherein the at least two types of agents comprise:

scheduled agents, wherein scheduled agents work during a predefined work schedule and wherein the number of scheduled agents associated with each node is based upon the expected minimum number of agents needed; and demand agents, wherein demand agents are on call and work only when necessary to fulfill a demand representing a difference between the actual number of agents needed and the expected minimum number of agents needed and wherein the number of demand agents on call is based at least on the difference between the expected maximum and the expected minimum number of agents needed.

\* \* \* \* \*